US008849465B2

(12) United States Patent
Wang et al.

(10) Patent No.: US 8,849,465 B2
(45) Date of Patent: Sep. 30, 2014

(54) SYSTEM AND METHOD FOR CONTROLLING SEMI-ACTIVE ACTUATORS ARRANGED TO MINIMIZE VIBRATION IN ELEVATOR SYSTEMS

(71) Applicant: Mitsubishi Electric Research Laboratories, Inc., Cambridge, MA (US)

(72) Inventors: Yebin Wang, Cambridge, MA (US); Scott A Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 32 days.

(21) Appl. No.: 13/772,980

(22) Filed: Feb. 21, 2013

(65) Prior Publication Data

US 2013/0299283 A1 Nov. 14, 2013

Related U.S. Application Data

(63) Continuation-in-part of application No. 13/471,312, filed on May 14, 2012.

(51) Int. Cl.

| | |
|---|---|
| ***G05B 21/00*** | (2006.01) |
| ***G05B 13/02*** | (2006.01) |
| ***B60G 17/018*** | (2006.01) |
| ***G05D 1/00*** | (2006.01) |
| ***B66B 1/36*** | (2006.01) |
| ***B66B 1/34*** | (2006.01) |
| ***B66B 7/04*** | (2006.01) |

(52) U.S. Cl.
CPC ................ *B66B 7/041* (2013.01); *B66B 7/042* (2013.01)
USPC ................ 700/280; 700/28; 700/32; 701/37; 701/48; 187/282; 187/391

(58) Field of Classification Search
USPC ................ 700/18, 19, 32, 280; 187/292, 393; 701/37, 48; 702/54, 56
See application file for complete search history.

(56) References Cited

U.S. PATENT DOCUMENTS

| | | | |
|---|---|---|---|
| 5,329,077 | A | 7/1994 | Skalski |
| 5,544,721 | A | 8/1996 | Roberts |
| 7,909,141 | B2 | 3/2011 | Utsunomiya |
| 8,011,478 | B2 | 9/2011 | Utsunomiya |
| 2012/0004777 | A1 | 1/2012 | Wang |
| 2013/0299283 | A1 | 11/2013 | Wang |

*Primary Examiner* — Kavita Padmanabhan
*Assistant Examiner* — Darrin Dunn
(74) *Attorney, Agent, or Firm* — Dirk Brinkman; Gene Vinokur

(57) ABSTRACT

A method controls a set of semi-active actuators arranged in an elevator system to minimize a vibration of an elevator car. The elevator system is represented with a model of a virtual elevator system having a single virtual semi-active actuator arranged to compensate a virtual disturbance. The virtual disturbance is determined using a motion profile of position of the elevator car during the operation and a disturbance profile of the virtual disturbance. A state of the elevator system is determined using the model of the virtual elevator system, the virtual disturbance and a signal indicative of a horizontal acceleration of the elevator car during the operation. Each actuator of the set of semi-active actuators is controlled based on the state of the elevator system and according to a control policy of the virtual semi-active actuator.

13 Claims, 21 Drawing Sheets

600

1000

SYSTEM AND METHOD FOR CONTROLLING SEMI-ACTIVE ACTUATORS ARRANGED TO MINIMIZE VIBRATION IN ELEVATOR SYSTEMS

CROSS-REFERENCE TO RELATED APPLICATIONS

This application is a continuation-in-part of U.S. patent application Ser. No. 13/471,312, filed on May 14, 2012, the disclosure of which being incorporated herein by reference.

FIELD OF INVENTION

This invention relates generally to controlling a set of semi-active actuators, and more particularly to controlling the set of semi-active actuators to minimize vibration in an elevator system.

BACKGROUND OF INVENTION

Vibration reduction in mechanical systems is important for a number of reasons, including safety and energy efficiency of the systems. Particularly, vibration in various transportation systems is directly related to ride quality and safety of passengers, and, thus, should be minimized. For example, vertical vibration in vehicles can be controlled by active or passive vibration reduction systems, which are generally referred as suspension systems. Similarly, the vibration induced during an operation of an elevator system can be minimized.

The elevator system typically includes a car, a frame, a roller guide assembly, and guide rails. The roller guides act as a suspension system to minimize the vibration of the elevator car. The car and roller guides are mounted on the frame. The car and frame move along the guide rail as constrained by the guide rollers. There are two principal disturbances which contribute to the levels of vibration in the car: (1) rail-induced forces which are transmitted to the car through the rail guides due to rail irregularities, and (2) direct-car forces such as produced by wind buffeting the building, passenger load distribution or motion.

Some methods, e.g., a method described in U.S. Pat. No. 5,544,721, U.S. Pat. No. 5,329,077, compensate for irregularity of the guide rail in the elevator system to improve the ride comfort. However, the method measures the irregularity of the guide rail with sensors, which is expensive. Also, for the complex elevators systems, controlling the elevator car based only on the horizontal irregularities of the rails can be ineffective.

Specifically, controlling vibration of the elevator car of the elevator system is complicated by the difficulties in determining a state of the elevator system during its operation. Therefore, various systems for controlling lateral vibration of the elevator cars use simple control logic to determine the damping force compensating the disturbance according to detected vibration level. For example, a system described in U.S. Pat. No. 7,909,141 schedules the damping coefficient of a damper according to the travel speed of the elevator car. The resultant control system is not optimal, because the travel speed of the elevator only partially reflects the characteristics of the disturbance. Other methods require various sensors to implement a sophisticated control. For example, a control system described in U.S. Pat. No. 8,011,478 requires position sensors and accelerometers. Such method is expensive.

SUMMARY OF INVENTION

It is an objective of some embodiments of an invention to provide a system and a method for controlling a set of semi-active actuators arranged in an elevator system to compensate for a set of disturbances on an elevator car in a horizontal direction. It is a further objective of some embodiments, to provide such system and method that optimizes the control of the semi-active actuators while minimizing a number of sensors for measuring parameters of an operation of the system. Various embodiments of the invention determine a control policy of the semi-active actuators. To minimize the number of measured parameters, some embodiments determine a control policy based on a parameter representing the vibration of the system. An example of the parameter is an acceleration signal indicative of the acceleration of an elevator frame or an elevator car in the elevator system. Accordingly, some embodiments decrease the cost of the control by using, during the operation of the elevator system, only the measurements of the accelerometer.

Some embodiments determine the control policy based on a model of the elevator system. The embodiments take advantage of another realization that a set of semi-active actuators can be controlled uniformly and thus a model of the elevator system can be simplified based on that uniformity. Accordingly, some embodiments represent the elevator system as a model of a virtual elevator system having a single virtual semi-active actuator arranged to compensate for a virtual disturbance.

The virtual semi-active actuator represents the set of semi-active actuators. For example, a compensative force of the virtual semi-active actuator represents compensative forces of the set of semi-active actuators. Similarly, the virtual disturbance represents a combination of the set of disturbances. Such realization allows defining the control policy for the virtual semi-active actuator, and controlling uniformly each actuator of the set of semi-active actuators according to the control policy of the virtual semi-active actuator.

However, even after the simplification based on the virtual system, it can be difficult to explicitly derive the optimal control policy due to difficulties in measuring disturbances or other parameters of the virtual system caused by the virtual disturbance, such as a displacement between ends of the virtual semi-active actuator or a relative velocity and position between the ends of the virtual semi-active actuator. On the other hand, the knowledge of the disturbance in time domain renders the state of the elevator system observable, i.e., determinable. The knowledge of the state and the disturbance allows implementing various advanced control methods, such as receding moving horizon and sub-optimal control methods, to minimize the vibration of the elevator car effectively.

Some embodiments are based on another realization that virtual vibration can be determined in advance using the model of the virtual elevator system and an acceleration signal indicative of a horizontal acceleration of the elevator car. For example, one embodiment augments the model with the virtual disturbance and a time derivative of the virtual disturbance as state variables and inverts the augmented model to determine a relationship between a second order time derivative of the virtual disturbance and the acceleration signal. Based on this relationship and the measurements of the acceleration signal the virtual disturbance can be determined.

Accordingly, various embodiments receive values of the acceleration signal measured at different vertical positions of the elevator car during an operation of the elevator system without usage of the set of actuators and determine, based on the model and the values of the acceleration signal, the vertical profile of the virtual disturbance. The vertical profile maps values of the virtual disturbance to corresponding vertical positions of the elevator car.

During operation of the elevator car, the disturbance profile of the virtual disturbance can be used to determine the virtual disturbance for the operation. For example, one embodiment determines the virtual disturbance during the operation of the elevator car using a motion profile of a movement of the elevator car during the operation and the disturbance profile of the virtual disturbance. The disturbance profile is predetermined and stored in a memory accessible by a processor of a control system. The motion profile of a position of the elevator car can be, e.g., determined by a motion controller of the elevator system. Such embodiment can be advantageous because allows to incorporate future disturbance in the control policy.

The model, the disturbance profile and an acceleration signal indicative of a horizontal acceleration of the elevator car during the operation can be used to determine a state of the elevator system. In turn, the knowledge of the state of the elevator system can be used to control semi-active actuators. For example, one embodiment controls each actuator of the set of semi-active actuators based on the state of the elevator system and according to a control policy of the virtual semi-active actuator.

Accordingly, one embodiment discloses a method for controlling a set of semi-active actuators arranged in an elevator system to minimize a vibration of an elevator car caused by a set of disturbances on the elevator car in a horizontal direction. The method includes representing the elevator system with a model of a virtual elevator system having a single virtual semi-active actuator arranged to compensate a virtual disturbance proportional to a sum of disturbances from the set of disturbances, wherein a compensative force of the virtual semi-active actuator is proportional to a sum of compensative forces of the set of semi-active actuators; determining the virtual disturbance during an operation of the elevator car using a motion profile of position of the elevator car during the operation and a disturbance profile of the virtual disturbance; determining a state of the elevator system using the model of the virtual elevator system, the virtual disturbance and a signal indicative of a horizontal acceleration of the elevator car during the operation; and controlling each actuator of the set of semi-active actuators based on the state of the elevator system and according to a control policy of the virtual semi-active actuator. Steps of the method are performed by a processor.

Another embodiment discloses a system for controlling a set of semi-active actuators arranged in an elevator system to compensate for a set of disturbances. The system includes a sensor for determining an acceleration signal indicative of a horizontal acceleration of the elevator car during an operation of the elevator system; a processor for determining, based on a model of a virtual elevator system and an acceleration signal, a disturbance profile of a virtual disturbance representing the set of disturbances, wherein the model of the virtual elevator system includes a single virtual semi-active actuator having a compensative force proportional to a sum of compensative forces of the set of semi-active actuators and arranged to compensate for the virtual disturbance proportional to a sum of disturbances from the set of disturbances, and wherein the acceleration signal is measured at different vertical positions of the elevator car during the operation of the elevator system without usage of the set of actuators; and a controller for controlling each actuator of the set of semi-active actuators according to a control policy of the virtual semi-active actuator using the disturbance profile of the virtual disturbance and the acceleration signal measured during the operation of the elevator car with usage of the set of actuators.

DETAILED DESCRIPTION OF EMBODIMENTS OF INVENTION

Various embodiments of an invention disclose a system and a method to control an elevator system having semi-active actuators. Some embodiments are directed to a suspension system subject to at least one external disturbance in a direction of a disturbance, and at least one semi-active actuator is controlled to minimize the vibration of one of masses induced by the corresponding disturbances.

For clarity purposes, this disclosure focuses on the control method of a system using semi-active actuators to minimize vibration induced by disturbances in one direction, and the system is subject to external disturbances in that direction. A control method to minimize vibration in multiple directions can be derived by generalizing the disclosed control method.

Given a set of disturbances and a set of semi-active actuators, some embodiments of the invention represent the system as a model of a virtual system having a single virtual semi-active actuator arranged to compensate a virtual disturbance. For example, a compensative force of the virtual semi-active actuator represents compensative forces of the set of semi-active actuators, and the virtual disturbance represents a combination of the set of disturbances. In various embodiments, such representation is based on assumption of uniformity of the semi-active actuators, i.e., all semi-active actuators are exactly the same, perform, and are controlled in a similar way.

In various embodiments of the invention, control of semi-active actuators is derived according to an optimal control theory and is based on the model of the system. In some embodiments, the model of the system is represented by a model of a virtual system. For example, one embodiment controls uniformly each actuator of the set of semi-active actuators according to an optimal control policy of the virtual semi-active actuator. Specifically, some embodiments are based on a realization that it is advantageous to control the set of actuators according to the optimal control policy that optimizes parameter of operation of the system.

Figure 1A:
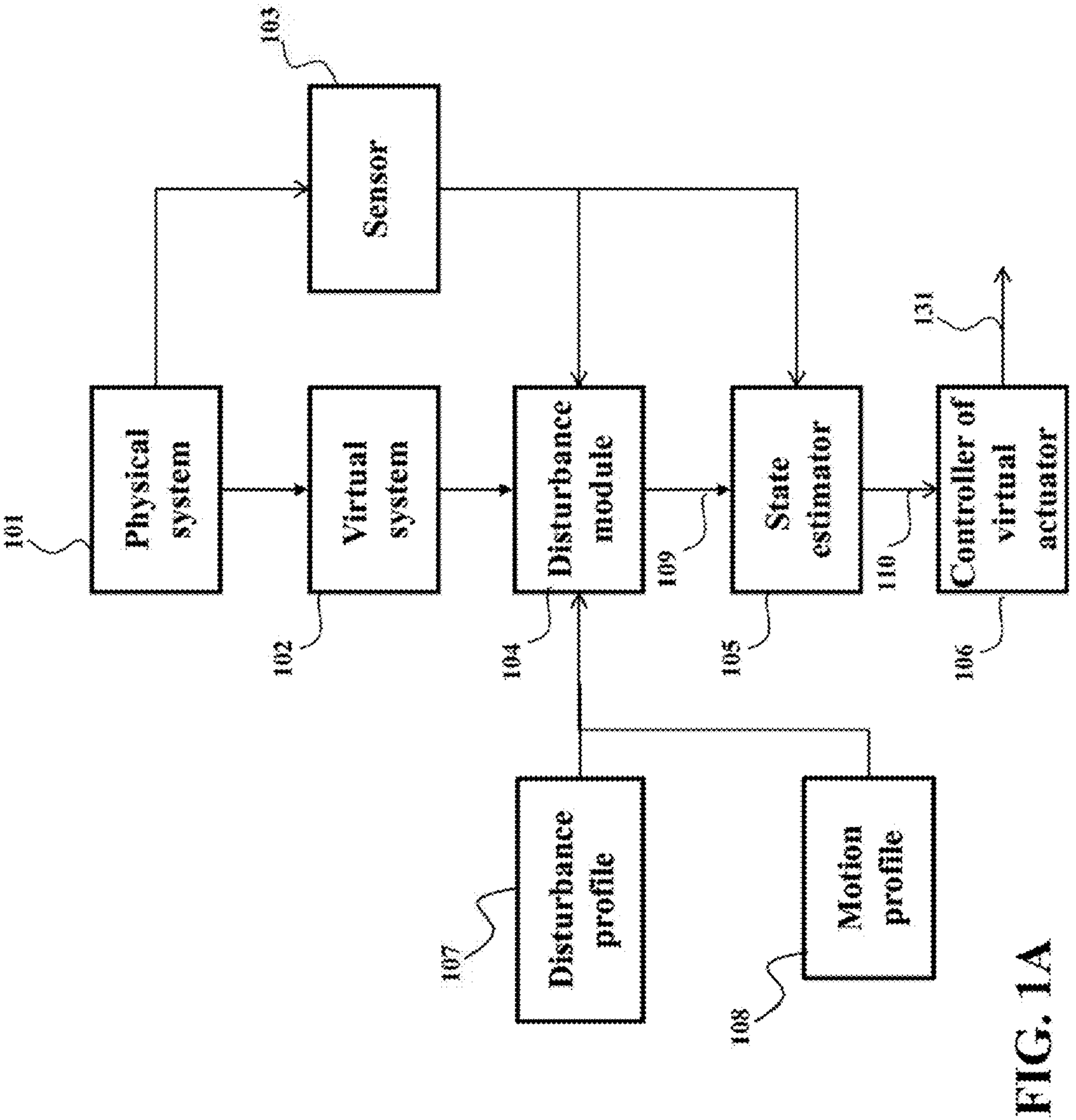
FIGS. 1A, 1B and 1C are block diagrams of a control method according to some embodiments of an invention.
Figure 1B:
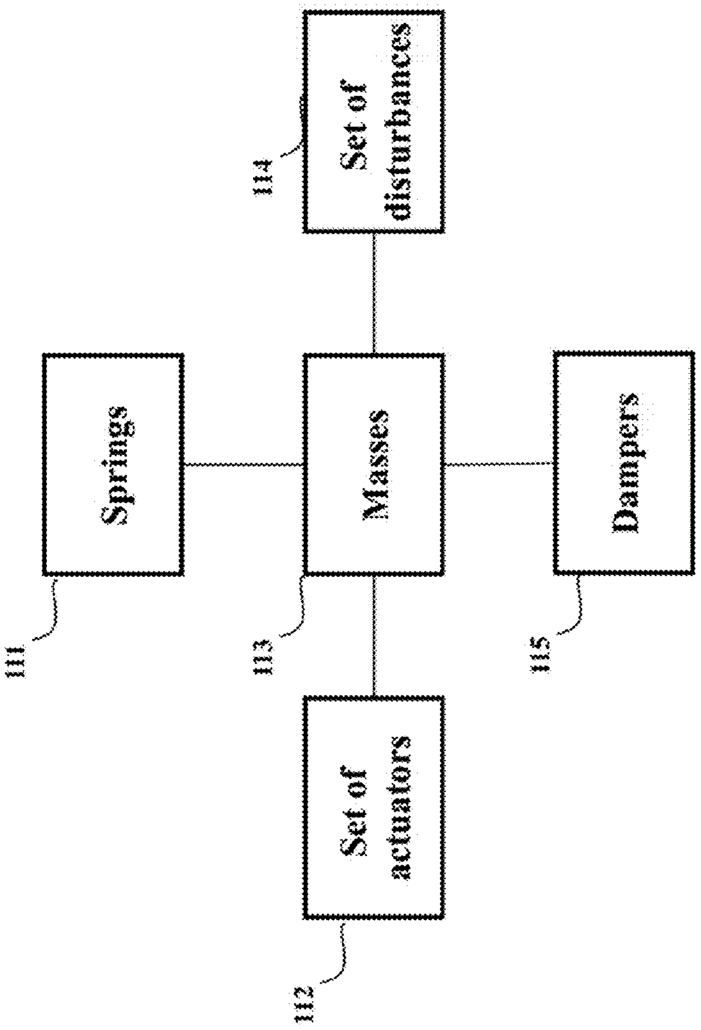
Figure 1C:
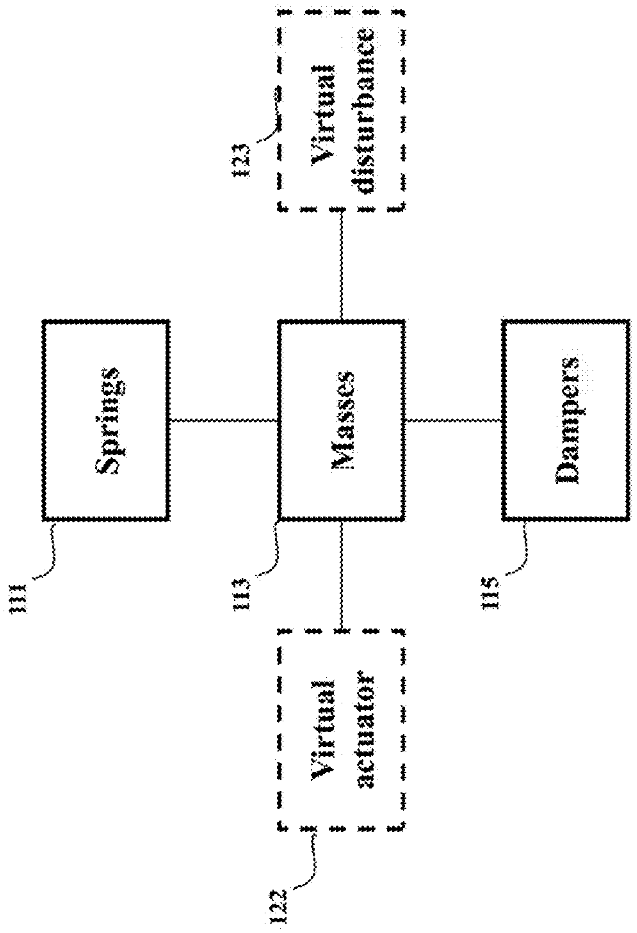

FIG. 1A shows a schematic of a system and method for controlling a set of semi-active actuators. The control method starts with a representation of a model of a physical system 101. FIG. 1B shows an example of the model, including one or a combination of masses 113, springs 111, dampers 115, and a set of semi-active actuators 112. The system is subject to a set of disturbances 114. In one embodiment, the system 101 is represented as a model of a virtual system 102 based on the assumption that all relevant semi-active actuators are exactly the same and perform uniformly. As shown in FIG. 1C, the virtual system includes one or combination of the masses 113, the springs 111, and the dampers 115. The virtual system also includes a virtual semi-active actuator 122, and is subject to a virtual disturbance 123.

The disturbances affect the movement of masses in one direction. One virtual disturbance in a specific direction represents the combined effect of all relevant disturbances on the movement of the masses in that direction. Similarly, a virtual actuator corresponding to a virtual disturbance in a specific direction accounts for the effect of all relevant semi-active actuators on the masses in that specific direction. For example, a compensative force of the virtual semi-active actuator can be determined as a function of sum compensative forces of the set of semi-active actuators.

Sensors 103 measure a signal indicating an operational status of the system 101. Given the model of the virtual system, a pre-determined disturbance profile 107, a motion profile, and the measured signal, a disturbance module 104 determines a virtual disturbance 109 of the virtual system. The disturbance profile 107 is determined offline and stored in memory for online use to reconstruct the virtual disturbance 109 corresponding to a real operation of the physical system. Given the virtual disturbance 109, a state estimator 105 determines a state 110 of the virtual system. The state includes a set of variables characterizing the behavior of the virtual system during operation. A control signal 131 is determined by a controller 106 according to various control policies of the virtual semi-active actuator. The control signal can vary either the voltage or current. The control signal 131 can be directly outputted to the semi-active actuators 112, or indirectly via amplifiers.

As shown in FIGS. 1B and 1C, the difference between the physical system and the virtual system is the presence of the virtual actuator and virtual disturbance in the virtual system. One embodiment, in order to determine the virtual system, determines the virtual disturbances and the virtual semi-active actuator. Under the assumption that all semi-active actuators corresponding to the movement of one mass in a specific direction perform uniformly, all disturbances affecting the movement of the mass in the specific direction can be combined as a virtual disturbance, and the effect of all corresponding semi-active actuators on the mass in the specific direction can be characterized by a virtual semi-active actuator which is mounted between the mass and the source of the virtual disturbance.

Figure 2:
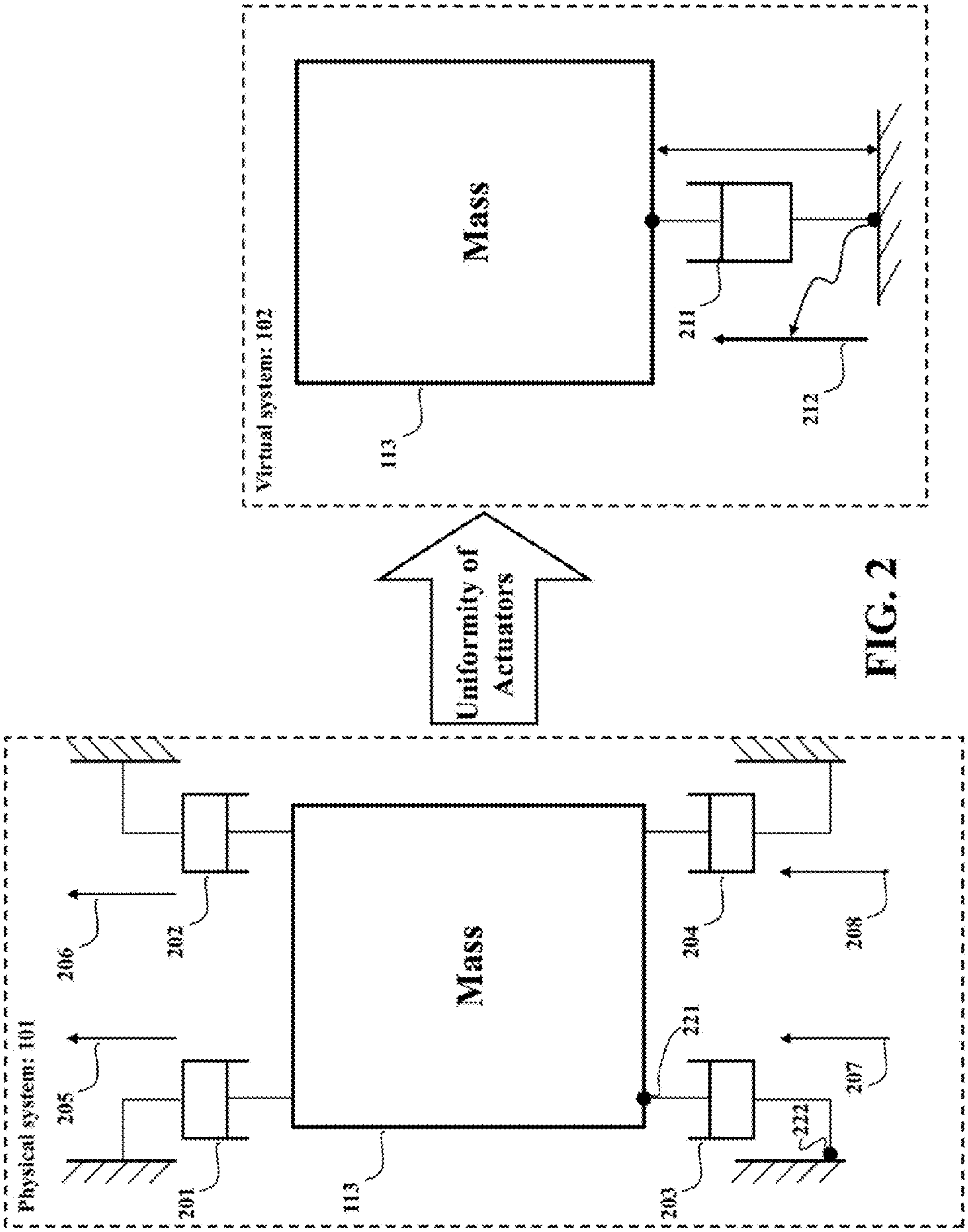
FIG. 2 is a schematic of determining a model of a virtual system including a virtual actuator according to some embodiments of the invention.

FIG. 2 shows an example of the physical system disturbed by four external disturbances $w_1$, $w_2$, $w_3$, $w_4$ in the vertical direction, denoted by 205, 206, 207, and 208, respectively. The set of semi-active actuators 201, 202, 203, 204 are mounted on the same mass 113 to compensate for the set of disturbances. Particularly, the first ends of four semi-active actuators, e.g., a first end 221, are mounted on the mass 113, and the second ends of four semi-active actuators, e.g., a second end 222, are mounted on corresponding sources of the disturbances $w_1$, $w_2$, $w_3$, $w_4$, respectively.

For example, in some embodiment each semi-active actuator is a semi-active damper having a controlled damping coefficient $u_i$, $1 \le i \le 4$. Assuming that all semi-active actuators are controlled uniformly, the physical system is minimized to a virtual system with a virtual disturbance 212 and the virtual semi-active actuator 211. Particularly, the virtual disturbance is a sum of four disturbances, and denoted as $$\overline{w} = \frac{1}{\sum_{i=1}^{4} u_i} \sum_{i=1}^{4} u_i w_i$$

The virtual semi-active actuator has a controlled damping coefficient of $$\overline{u} = \sum_{i=1}^{4} u_i.$$

For the embodiment with all the semi-active actuators having the same controlled damping coefficients, the virtual semi-active actuator has a controlled damping coefficient $\overline{u}=4u_1$, and the virtual disturbance is $$\overline{w} = \frac{1}{4} \sum_{i=1}^{4} w_i.$$

Without loss of generality, all k semi-active actuators, a type of damping device, are applied on the same mass m with a displacement x. Hence, the $i^{th}$ semi-active actuator generates a compensating force of $f_i=u_i(\dot{x}-\dot{w}_i)$ where $u_i$ is the controlled damping coefficient of the $i^{th}$ semi-active actuator. The compensating forces of the set of semi-active actuators are $$f = \sum_{i=1}^{k} u_i(\dot{x} - \dot{w}_i),$$

where the dots above the variables indicate derivatives.

In one embodiment, the semi-active actuators perform uniformly, and the semi-active actuators have the same controlled damping coefficients, the compensating forces of all semi-active actuators is $$f = u \sum_{i=1}^{k} (\dot{x} - \dot{w}_i) = ku\left(\dot{x} - \frac{1}{k} \sum_{i=1}^{k} \dot{w}_i\right),$$

based on which a virtual semi-active actuator generates the same compensating force as all k semi-active actuators can be determined. For example, the controlled damping coefficient of the virtual semi-active actuator is ku, the virtual relative velocity of the virtual semi-active actuator is $$\dot{x} - \frac{1}{k} \sum_{i=1}^{k} \dot{w}_i,$$

and the virtual disturbance is $$\frac{1}{k} \sum_{i=1}^{k} \dot{w}_i.$$

Figure 3:
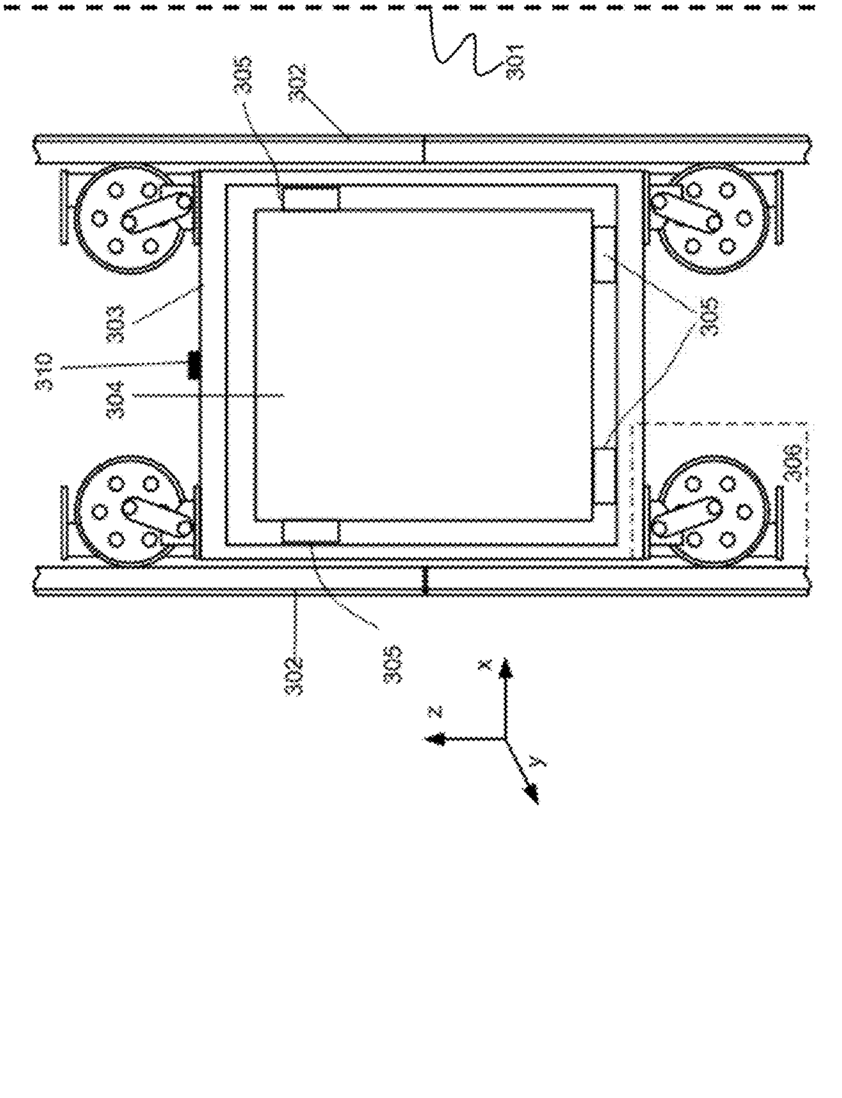
FIG. 3 is a schematic of an elevator system according to some embodiments of the invention.

FIG. 3 shows an example of a portion of an elevator system including two guide rails 302, a frame 303, a car 304, four car support rubbers 305, and four roller guides 306. In this not limiting example, each roller guide includes three rollers 401 (center roller, front roller, and back roller), and three rotation arms 405 corresponding to three rollers. The elevator system includes four center, front, and back rollers respectively. The guide rails 302 are installed vertically (z-axis) in an elevator hoistway 301. The frame 303 supports the car 304 via the vibration isolating rubbers 305. The frame can move vertically in the hoistway of the elevator shaft. A roller guide 306 guides the movement of the frame 303 along guide rails 302.

Figure 4:
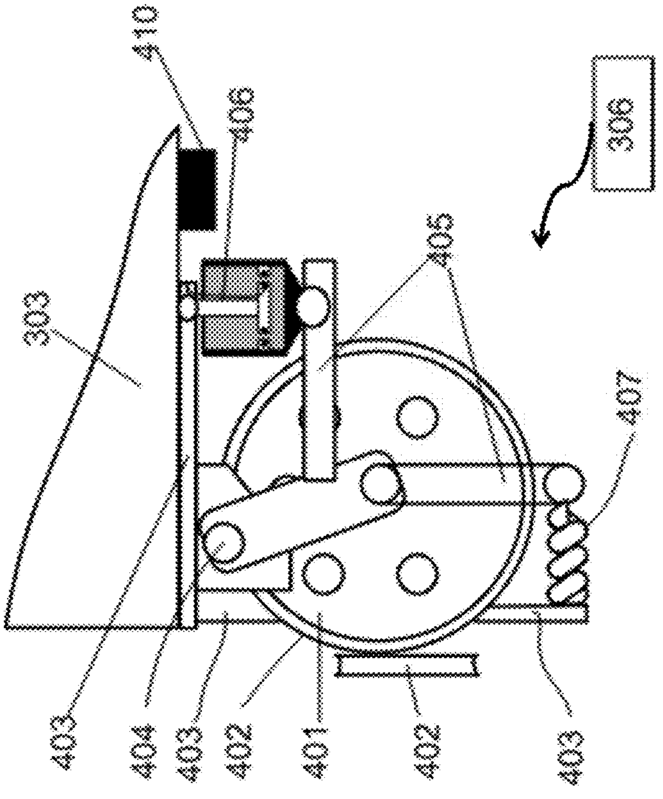
FIG. 4 is a schematic of a roller guide assembly with a semi-active actuator installed on a center roller according to some embodiments of the invention.

FIG. 4 shows a part of a roller guide assembly 306 with a center roller 401 serving to minimize the vibration of the elevator car in the right-to-left direction (x-axis). As shown in FIG. 4, the center roller 401 maintains contact with the guide rail 302 through a roller gum 402. The roller is mounted on a base 403 of the frame, and can rotate around a pivot 404 whose axis is along a front to back direction (y-axis). A rotation arm 405 rotates at the same angular velocity as the roller around the pivot 404. In one embodiment, a semi-active actuator 406 is installed between the frame base 403 and the rotation arm 405. A roller spring 407 is installed between the rotation arm 405 and the frame base 403.

Referring back to FIG. 3, the level variation of the guide rails causes the rotation of the roller around the pivot. The rotation of the roller induces the lateral movement of the frame due to a coupling between the rotation arm and the frame base through the roller spring, i.e. the level variation of the guide rails is a source of the disturbances. The lateral movement of the frame further induces the movement of the car by their coupling 305. The elevator car moves in either front to back (y-axis) and/or left to right (x-axis) directions. Damping devices between the roller and the frame, or the frame and the car, can control the lateral vibration of the car.

A semi-active actuator is installed between one end of the rotation arm and the base. The semi-active actuator generates a force based on a relative lateral movement between the rotation arm and the frame. This force can remove the energy transferred to the frame, and thus damp the vibration of the frame. Consequently, the vibration of the elevator car is minimized.

According to various embodiments of the invention, the elevator system also includes a sensor 310 for measuring a parameter representing a vibration level of the elevator car during the operation of the elevator system. For example, an acceleration of the elevator car reflects the ride comfort that passengers feel, thus the sensor 310 can be an accelerometer for measuring an acceleration of the elevator frame 303 or for measuring directly the acceleration of the elevator car 304. In some embodiments, the semi-active actuators 306 are controlled, e.g., by a controller 410, according to the control policy based on the measured signal during the operation of the elevator system. In one embodiment, the acceleration of the elevator frame is measured to reduce the number of sensors and the cost of the system.

In one embodiment, the roller guide assembly includes a linear/rotary theological actuator arranged between the base and the rotation arm as shown in FIG. 4. The rheological actuator can include a magneto-rheological (MR) fluid, or an electro-rheological (ER) fluid. Generally, flow characteristics of the rheological fluid can be actuated by either a magnetic or electrical signal. Due to the linear relative velocity between the frame and the end point of the rotation arm, the frame vibration is minimized by selectively adjusting the damping coefficient of the linear MR actuator according to the feedback signal. In another embodiment, actuators generating damping forces based on Coulomb friction can be mounted to the roller guide assembly to control the movement of the elevator system.

In the case of the MR actuator, the controller can selectively turn the MR actuators ON or OFF in response to the vibrations, and output the corresponding signal to the amplifier. To turn the MR actuator ON, the amplifier outputs an electric current to the coil of the MR actuator. The coil current establishes the required magnetic field to increase the viscosity of MR fluids inside the housing of the MR actuator, thus change the damping coefficient of the MR actuator. To turn the MR actuator OFF, no current is output by the amplifier, thus the damping coefficient of the MR actuator is minimal. In another embodiment, the MR actuator can be turned on continuously, i.e. the controller continuously adjust the damping coefficient of the MR actuator.

There are numerous variations configuration of assembling semi-active actuators with the elevator system. In one embodiment, one semi-active actuator is installed for each roller. Considering the purpose of the semi-active suspension to minimize the acceleration of the floor of the elevator car, the semi-active actuators installed on the lower roller guide assembly play major impact on the achievable vibration reduction performance. Hence, another embodiment uses six semi-active actuators over the two lower roller guides. Further reduction of the number of semi-active actuators is possible. For example, one embodiment uses only four semi-active actuators, two over the lower center rollers, one over the lower left front roller, and one over the lower right front roller. Another embodiment is to use two semi-active actuators: one over a lower center roller to damp left-to-right movement, and the other over a lower front or back roller to damp front-to-back movement.

In one embodiment satisfying the aforementioned symmetry condition, the elevator suspension includes eight semi-active actuators, i.e., one semi-active actuator is installed on the center roller of each roller guide, and one semi-active actuator is installed on the front roller of each roller guide. Even if the symmetry condition is not strictly satisfied, for some embodiments, the established virtual system by simplification can still represent the physical system fairly well when the physical system is close to symmetry. Methods taught here should not be limited to applications in physical systems satisfying the symmetry condition.

For example, one embodiment is directed to teach the control method of the semi-active scheme for the full elevator system, where eight semi-active actuators are installed on four roller guides, i.e., one semi-active actuator for each center roller, and one semi-active actuator for each front roller. An example of the configuration of the semi-active actuator on a roller of an elevator is shown in FIG. 4. Various embodiments of this invention determine the virtual system, determine the disturbance profile and estimated virtual disturbance, design the state estimator, and control law, which does not necessarily strictly satisfy the symmetry condition. Some notations used in this disclosure are given in Table 1.

TABLE 1

| Notations | |
|---|---|
| Notation | Description |
| $^{x}$-axis | right to left movement |
| $^{y}$-axis | back and forth movement |
| $^{z}$-axis | vertical movement |
| $x_c$, $x_f$ | $^{x}$-axis movement of the car and the frame |
| $\theta_c^y$, $\theta_f^y$ | $^{y}$-axis rotation of the car and the frame |

TABLE 1-continued

| Notations | |
|---|---|
| Notation | Description |
| $\theta_r^{yi}$ | $y$-axis rotation of the $i^{th}$ rotation arm |
| $m_c$, $m_f$ | the masses of the car and the frame |
| $I_c^y$, $I_f^y$ | the inertia of the car and the frame around the $y$-axis |
| $k_c^x$ | weighted stiffness of car-hold rubber (right to left direction) |
| $b_c^x$ | weighted damping of car hold rubber (right to left direction) |
| $k_g^x$ | the stiffness of a roller gum (right to left direction) |
| $b_g^x$ | the damping coefficient of a roller gum (right to left direction) |
| $l_c^y$ | Vertical displacement between the force $f_c^x$ and nd the mass center of the car |
| L | length between arm pivot and actuator force point |
| $R_1$ | height between arm pivot and the point where the roller contacts the rail |
| $h_1$ | height between arm pivot and the roller spring |
| $l_f^{yi}$ | height between the frame center of mass and the point where the $i^{th}$ roller contacts the rail |
| $w_i^x$ | the disturbance applied on the $i^{th}$ roller in $x$-axis |
| $u_i^x$ | the damping coefficient of the actuator installed on the $i^{th}$ roller |

The car and frame movement in the right-to-left direction or in x-axis, and the car and frame movement in the back-to-forth direction or in Y-axis are decoupled. One embodiment considers the control method for semi-active actuators to minimize the vibration of the elevator in the right-to-left direction.

Figure 5A:
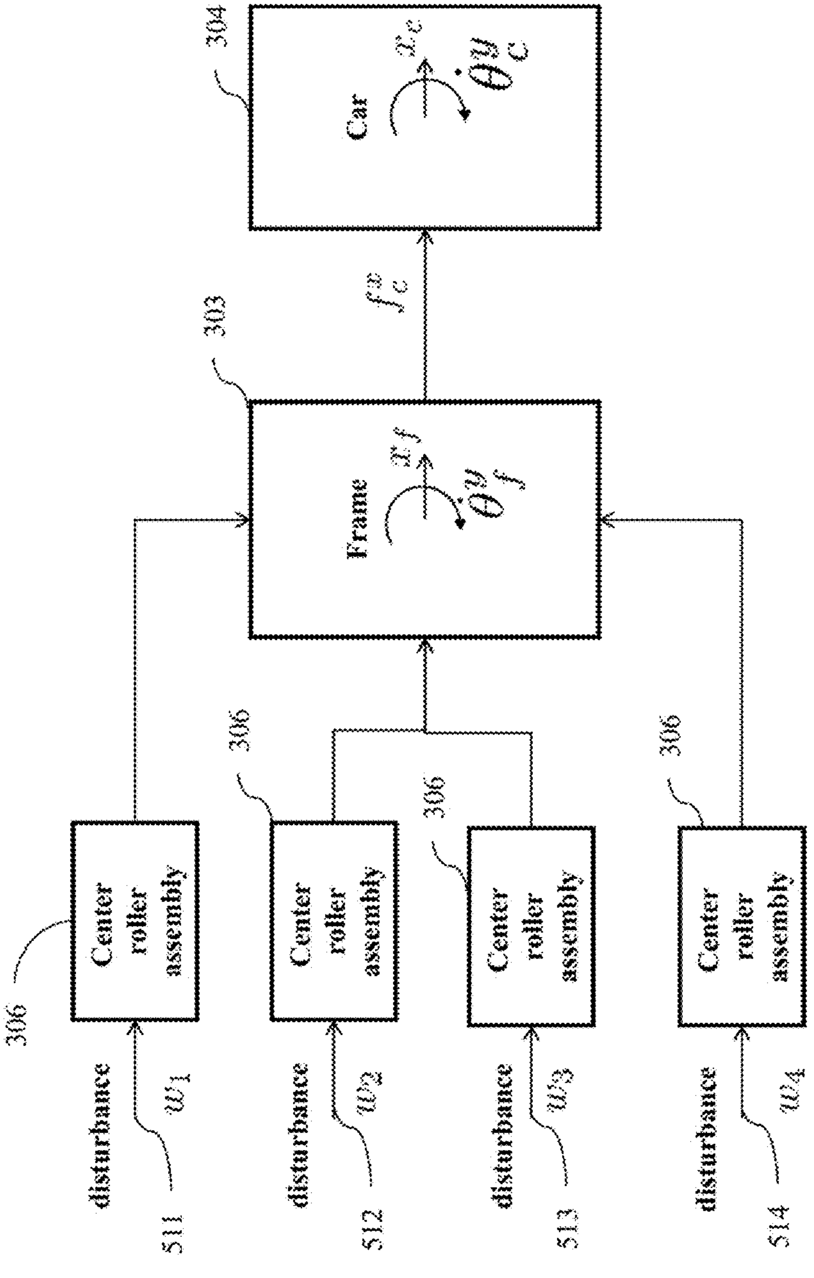
FIGS. 5A and 5B are schematic of disturbances of the elevator system of FIG. 3.

FIG. 5A shows a schematic of exemplar disturbances of the elevator system. In this example, the elevator system is subject to four disturbances, 511, 512, 513, and 514, in the right-to-left direction. The four disturbances are applied to the elevator system through four center roller assemblies 306, and excite the translational movement of frame 303 in the right-to-left direction, and the rotation of the frame around the y-axis. The translation and rotation of the frame further excite the translation and rotation of the car 304 in the right-to-left direction and around the y-axis respectively. The right-to-left movement of the car and the frame are coupled with the rotation of the car and the frame around the y-axis. This embodiment gives the dynamics of movements of the car and the frame in the x-axis, the rotations of the car and the frame around y-axis, and the rotation of the four center rollers. The rest of dynamics can be similarly derived but are irrelevant to minimize the vibration in the right-to-left direction.

The control method can be implemented by the controller 410 based on the parameter representing an acceleration of the elevator car measured by the sensor 310. The controller controls the set of semi-active actuators according to various control policies of a virtual semi-active actuator representing the set of actuators, as discussed later.

The elevator car can be subject to various forces result from the interaction with the frame. These forces can include the spring and damping forces resulting from support rubbers between the car and the frame, which is denoted by a lumped force $f_c^x$, and written as $$f_c^x = k_c^x(x_c - x_f + l_x^y(\theta_x^y - \theta_f^y)) + b_c^x(\dot{x}_c - \dot{x}_f + l_c^y(\dot{\theta}_c^y - \dot{\theta}_f^y))).$$

Similarly, the rotation of the car around the y-axis is induced by the lumped torque, corresponding to the lumped force $f_c^x$, denoted by $$T_c^x = l_c^y f_c^x.$$

The translational movement of the frame including the frame and all roller guides in x-axis is subject to the forces from its interaction with the car and the guide rails, all of which are type of spring and damping forces. The lumped spring and compensating force result from the roller gums of four center rollers is denoted by $f_g^x$ and written as $$f_g^x = \sum_{i=1}^{4} f_g^{xi},$$

$$f_b^{xi} = k_g^x(x_f + R_1\theta_r^{yi} + l_f^{yi}\theta_f^y - w_i^x) + b_g^x(\dot{x}_f + R_1\dot{\theta}_r^{yi} + l_f^{yi}\dot{\theta}_f^y - \dot{w}_i^x),$$

where $f_s^{xi}$ represents the spring and damping forces result from the roller gum of the $i^{th}$ center roller. Hence the dynamics of the frame translation in the right-to-left direction is $$(m_f + m_r)\ddot{x}_f + \sum_{i=1}^{4} p_2^{xi}\ddot{\theta}_r^{yi} - f_c^x + f_g^x = 0,$$

where $p_2^{xi}$ is an appropriate constant.

The roller is subject to the torque corresponding to forces result from the interaction between the roller gum and the guide rail, which is denoted by $$T_g^x = \sum_{i=1}^{4} T_g^{xi},$$

$$T_g^{xi} = R_1 f_g^{xi}.$$

The torque, around the pivot arms, corresponding to the spring and damping forces of the roller spring, is denoted by $$T_r^x = \sum_{i=1}^{4} T_r^{xi},$$

$$T_r^{xi} = h_1(k_r^x h_1\theta_r^{yi} + b_r^x h_1\dot{\theta}_r^{yi}).$$

The torque corresponding to the compensating force of semi-active actuators is $$T_u^x = \sum_{i=1}^{4} T_u^{xi},$$

$$T_u^{xi} = L^2 u_i^x \dot{\theta}_r^{yi}.$$

The dynamics of the elevator including the translation and rotation of the car and the frame in the right-to-left direction, and the rotation of the center rollers around their pivots are $$m_c\ddot{x}_c + f_c^x = 0, \tag{8}$$

$$I_c^y\ddot{\theta}_c^y + T_c^x = 0, \tag{9}$$

$$(m_f + m_r)\ddot{x}_f + \sum_{i=1}^{4} p_2^{xi}\ddot{\theta}_r^{yi} - f_c^x + f_g^x = 0, \tag{10}$$

$$p_2^{xi}\ddot{x}_f + p_3^{xi}\ddot{\theta}_f^y + I_r^y\ddot{\theta}_r^{yi} + T_g^{xi} + T_r^{xi} + T_u^{xi} = 0, \quad 1 \le i \le 4, \tag{11}$$

wherein $p_3^{xi}$ are constant, and $I_r^y$ is the inertial of the rotation arm and center roller with respect to the pivot.

In one embodiment, the coupling terms $p_2^{xi}\ddot{\theta}_r^{yi}$ and $p_2^{xi}\ddot{x}_f$ are ignored because the rest terms in the dynamics is dominant. Thus, the physical system model represented by Equations (8-11) can be simplified by considering $$p_2^{xi}=0, p_2^{xi}=0.$$

The virtual system is determined by manipulating the dynamics of the physical system. With the assumption that all semi-active actuator perform uniformly, the summation of Equation (11) for 1≤i≤4 is $$I_r^y \sum_{i=1}^{4} \ddot{\theta}_r^{yi} + T_g^x + T_r^x + T_u^x = 0, \tag{12}$$

which allows the definition of a virtual semi-active actuator with a damping coefficient $$u = \frac{1}{4} \sum_{i=1}^{4} u_i^x = u_i^x,$$

a virtual disturbance $$w^x = \sum_{i=1}^{4} w_i^x,$$

and a corresponding virtual relative velocity $$\dot{\theta}_r^y = \sum_{i=1}^{4} \dot{\theta}_r^{yi}.$$

Figure 5B:
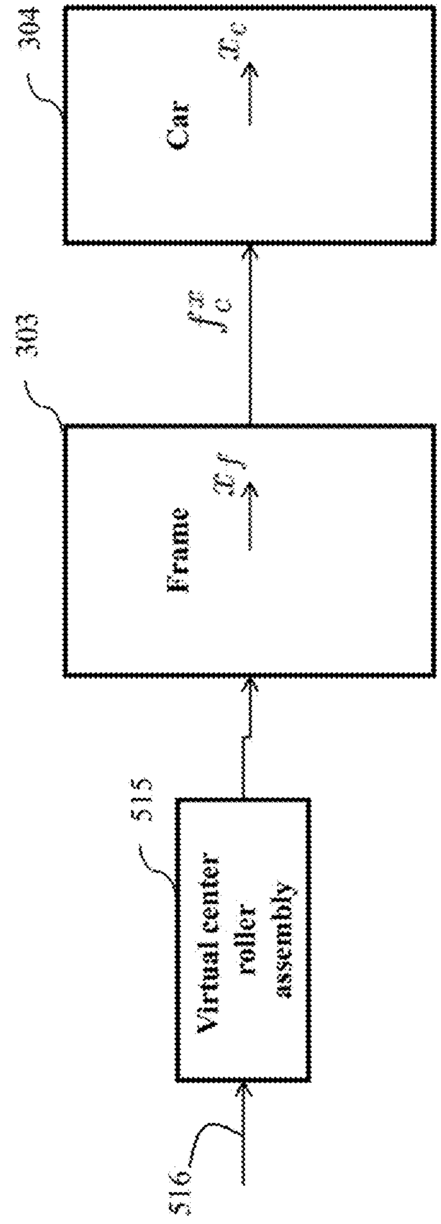

Thus, the virtual system is derived and shown in FIG. 5B, which includes the virtual disturbance 516, the virtual center roller assembly 515 including the virtual semi-active actuator, the frame 303, and the car 304.

Based on the virtual system model, constraints on the virtual semi-active actuator, and the optimal control theory, the embodiment determines the optimal control policy for minimizing the vibration of the elevator car in the right-to-left direction as $$u^x = \begin{cases} b_{max}, & \varphi(x, y, t)\dot{\theta}_r^y > 0, \\ b_{min}, & \text{otherwise.} \end{cases}$$

where φ(x,y,t) is the state function, x represents a vector of co-state and state variables, including translational displacements and velocities of the car and the frame, angular displacement and velocity of the rotation arms, y denotes the measured signal from sensor 103, and t represents the dependence on the virtual disturbance.

A control method for the disclosed semi-active suspension of the elevator uses the approximation of the state function φ(x,y,t) of state and co-state of the system and the function of displacement $\dot{\theta}_r^y$ or the virtual relative velocity.

Some embodiments approximate the values of the state function and the function of displacement in the optimal control policy. The approximation of these functions is dependent on the measurements. Particularly, the approximation of the function of displacement is also related to the configuration of the semi-active actuators.

Figure 6A:
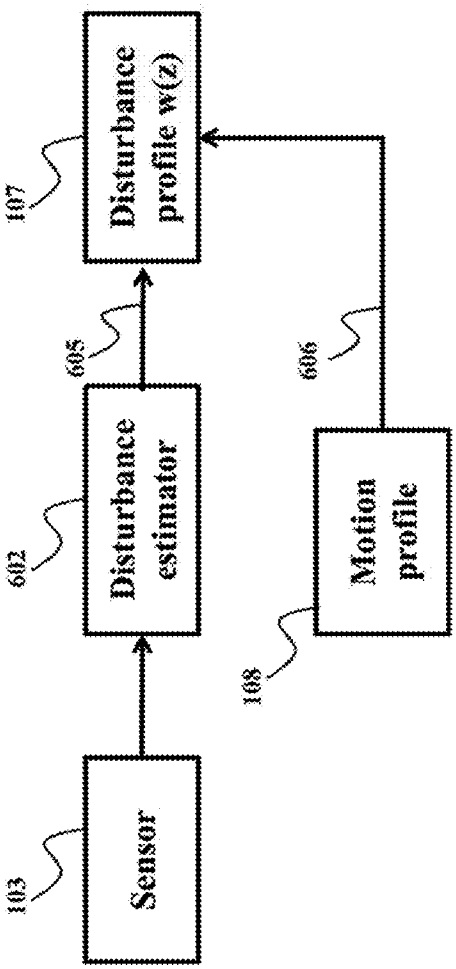
FIGS. 6A, 6B, 6C, 6D and 6E are block diagrams of various methods for determining a disturbance profile.

FIG. 6A shows a schematic of a method 600 for determining the disturbance profile 107 according to one embodiment of the invention. The method 600 can be performed offline by running the elevator at least once. The elevator system can be run without the usage of actuators 112. The sensor 103 outputs the measured signal, e.g., acceleration, to a disturbance estimator 602, which produces an estimated disturbance 605 as a function of time. A motion profile 108 outputs a vertical position trajectory 606 defining the position of the elevator car as a function of time. The trajectory 606 can be combined with the estimated disturbance 605 to produce the disturbance profile 107 as a function of vertical position. The disturbance profile block 107 determines the virtual disturbance profile based on the virtual disturbance in time domain and the map between time and the vertical position as determined by the motion profile.

Figure 6B:
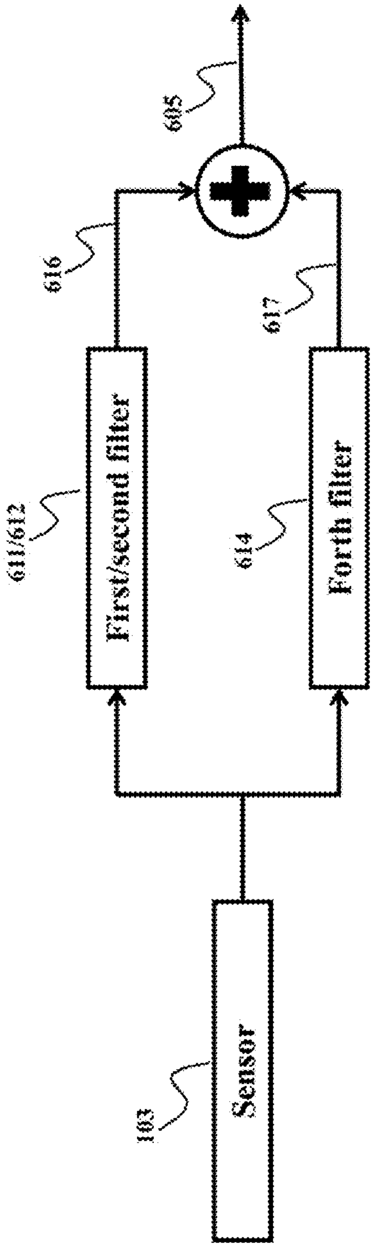
Figure 6C:
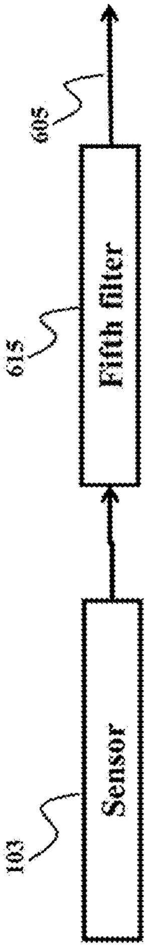

FIGS. 6B and 6C illustrate two embodiments of implementation of the disturbance estimator 602. Both embodiments only require accelerometers as sensors. In one embodiment shown in FIG. 6B, the sensor 103 outputs the frame's translational acceleration in right-to-left direction to a first filter 611, a second filter 612, and a forth filter 614. The first and second filters process the acceleration signal and produce the estimated virtual relative position 616 between two ends of the virtual actuator. Example of the virtual relative position can formulated as $$\hat{\theta}_r^y(t) = \hat{w}^x(t) - \hat{x}_f(t),$$

where $\hat{w}^x$ denotes an estimated virtual disturbance, and $\hat{x}_f$ denotes an estimated translational displacement of the frame along the right-to-left direction. The forth filter processes the acceleration signal to produce the estimated translational displacement 617, of the frame along the right-to-left direction $\hat{x}_f$. Summation of signals 616 and 617 gives the estimated virtual disturbance $\hat{w}^x$.

FIG. 6C shows the embodiment processing the acceleration signal using a fifth filter 615 to produce the estimated virtual disturbance $\hat{w}^x$ directly. The estimated virtual disturbance, combined with the vertical position profile, is mapped into the virtual disturbance profile. Examples of various implementations of the filters are described in more details below.

Figure 6D:
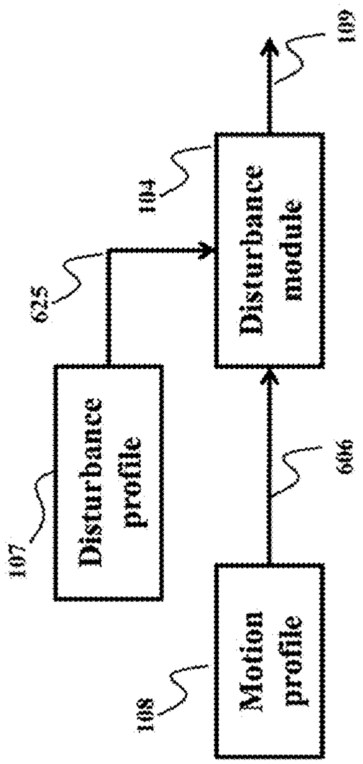
Figure 6E:
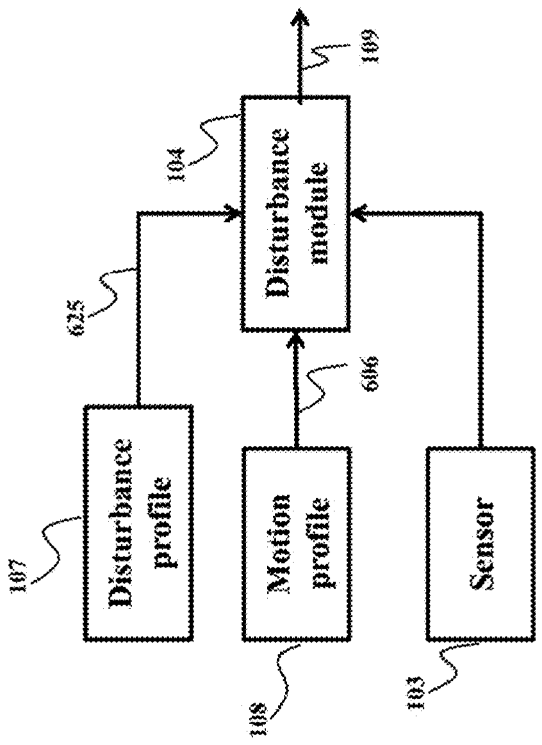

FIGS. 6D and 6E shows block diagrams of methods for determining the virtual disturbance for each operation of the elevator. The virtual disturbance can be different for different operations, e.g., for different trips of the elevator car. Advantageously, various embodiments of the invention can address various disturbances of the elevator system including, but not limited to, the deformation of the guide rails.

In one embodiment shown in FIG. 6D, given the virtual disturbance profile 625 provided by the disturbance profile block 107, and the vertical position trajectory 606 for a trip of the elevator car determined before the operation of the elevator system, the virtual disturbance 109 during the entire period of the operation can be determined 104 before the trip. The vertical position trajectory 606 is determined by a motion profile 108, which could be a motion planner for the elevator case.

FIG. 6E shows a diagram of another embodiment, in which the acceleration signal from sensor 103 are used to preview the disturbance over the entire period of each operation of the elevator, and correct the previewed virtual disturbance realtime. The vertical position trajectory 606 is used to preview the virtual disturbance over the entire period of each operation before the elevator runs the operation, whereas the acceleration signal from sensor 103 is fused to the vertical position trajectory 606 to improve the accuracy of the vertical position trajectory while the elevator runs the operation, thus corrects the virtual disturbance over the rest operation time.

Figure 7A:
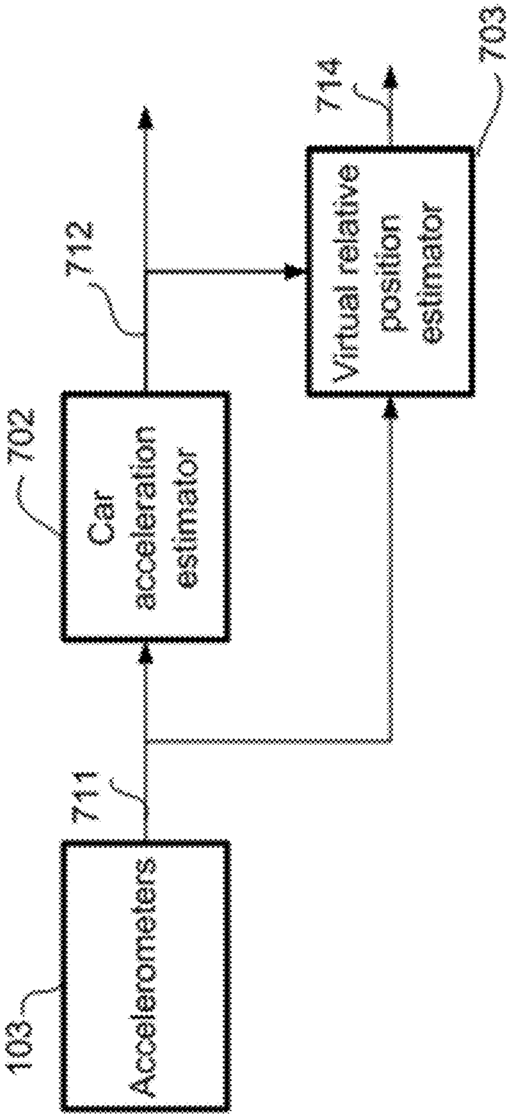
FIGS. 7A, 7B and 7C are block diagrams of an estimator used for the elevator system to reconstruct the virtual disturbance.

FIG. 7 illustrates exemplar implementations of the first, the second, and the fifth filters. In one embodiment, the first filter is implemented as a car acceleration filter 702, which processes the acceleration signal 711 of the frame, sensed by accelerometer 103, to produce an estimated translational acceleration signal 712 of the car in right-to-left direction. The second filter is implemented as a virtual relative position estimator 703, which processes the acceleration signal 711 and the estimated car translational acceleration 712 to produce the estimated virtual relative position and velocity 714.

In one embodiment, four semi-active actuators are installed on all four center rollers to minimize the vibration in the x-axis. This embodiment designs the first and second filters on the basis of the virtual system given by Equations (8), (10), and (12). Assuming that the semi-active actuators perform the same action, the model of the virtual relative position, denoted by $$\eta = \sum_{i=1}^{4} \theta_r^{yi}, \tag{13}$$

is given by $$T_g^x + I_r^y \ddot{\eta} + (h_1^2 b_r^x + L^2 u^x)\dot{\eta} + h_1^2 k_r^x \eta = 0,$$

where $u^x = u_i^x$ for 1≤i≤4 is the controlled damping coefficient of the virtual semi-active actuator. The dynamics of the virtual relative position is described by a linear time varying differential equation depending on the virtual relative position, the virtual relative velocity, the virtual control, and the torque from the roller gum $T_g^x$. Given the variable $T_g^x$ and the dynamics of the virtual relative position (13), the second filter for estimating the virtual relative position is determined as follows $$\dot{\hat{\eta}}_1 = \hat{\eta}_2,$$

$$\dot{\hat{\eta}}_2 = -\frac{1}{I_r^y}[(L^2 u^x + h_1^2 b_1)\hat{\eta}_2 + h_1^2 k_1 \hat{\eta}_1] - \frac{1}{I_r^y} T_g^x,$$

$$z_1 = \hat{\eta}_1,$$

$$z_2 = \hat{\eta}_2,$$

wherein $z_1$ denotes the estimated virtual relative position, $z_2$ denotes the estimated virtual relative velocity, $I_r^y$ is an inertial of a rotation arm with respect to a pivot, L is a length between the pivot and an actuator force point, $u^x$ is a viscous damping coefficient of the virtual semi-active actuator, $h_1$ is a height between the pivot and a roller spring, $b_1$ is a damping coefficient of the roller spring, $k_1$ is a stiffness of the roller spring, and $T_g^x$ represents a torque around the pivot. The output of the second filter $z_2$ approximates the virtual relative velocity $\dot{\theta}_r^y$. The approximate value of the virtual relative velocity $z_2$ converges exponentially to the true value of the virtual relative velocity $\theta_r^y$. The approximate value of the virtual relative position $z_1$ converges exponentially to the true value of the virtual relative position $\theta_r^y$.

In another embodiment, only two semi-active actuators are installed on two out of four center rollers to minimize the vibration in the x-axis. This embodiment designs the second filter on the basis of the virtual system, and the second filter is similar to the filter of the previous embodiment.

The value of $T_g^x$ can be obtained by using the output of the first filter. For example, one embodiment assumes that translational and angular accelerations of the frame are measured. The car dynamics in Equations (8)-(9) are rearranged to estimate the car accelerations from the measured frame accelerations $$m_c\ddot{x}_c + k_c^x(x_c + l_c^y\theta_c^y) + b_c^x(\dot{x}_c + l_c^y\dot{\theta}_c^y) = k_c^x(x_f + l_c^y\theta_f^y) + b_c^x(\dot{x}_f + l_c^y\dot{\theta}_f^y),$$

$$I_c^y\ddot{\theta}_c^y + l_c^y k_c^x(x_c + l_c^y\theta_c^y) + l_c^y b_c^x(\dot{x}_c + l_c^y\dot{\theta}_c^y) = l_c^y k_c^x(x_f + l_c^y\theta_f^y) + l_c^y b_c^x(\dot{x}_f + l_c^y\dot{\theta}_f^y). \tag{14}$$

The Laplace transformation of Equation (14) is $$(M_c s^2 + B_c s + K_c)X_c(s) = (B_c s + K_c)X_f(s),$$

where $X_c(s)=[x_c(s),\theta_c^y(s)]$ is the Laplace transformation of $[x_c,\theta_c^y]$, and $X_f(s)=[x_f(s),\theta_f^y(s)]$ is the Laplace transformation of $[x_f,\theta_f^y]$, s is a complex frequency, and $M_c$, $B_c$, $K_c$ are appropriate matrices. The car accelerations can be estimated by filtering the frame accelerations through the following first filter whose transfer function is given by $$G_c(s) = (M_c s^2 + B_c s + K_c)^{-1}(B_c s + K_c).$$

According to the estimation of the car accelerations, the value of the lumped force $f_c^x$ is known. Thus the value of the lumped force from the roller gum $f_g^x$ can be computed according to equation (10), which implies the value of the torque $T_g^x$. Thus the second filter is designed.

One embodiment of the first filter further simplifies the estimation of the value of the torque $T_g^x$. This embodiment only measures the translational acceleration of the frame, e.g., along the x-axis. As disclosed above, the estimation of the acceleration of the elevator car along x-axis requires the knowledge of frame's translational acceleration along x-axis and rotational acceleration around y axis. The rotational dynamics of the car and the frame can be decoupled from the translational dynamics due to its negligible effect, and Equation (14) is simplified as $$m_c\ddot{x}_c + k_c^x x_c + b_c^x \dot{x}_c = k_c^x x_f + b_c^x \dot{x}_f. \tag{15}$$

From Equation (15), the car acceleration in x-axis can be estimated as the output of the following first filter whose input is the frame acceleration in x-axis $$G(s) = \frac{b_c^x s + k_c^x}{m_c s^2 + b_c^x s + k_c^x}.$$

The G(s) is the transfer function of the first filter whose input is translational acceleration of the elevator frame in, e.g., right to left direction, and the output is the estimated translational acceleration of the elevator car in, e.g., right to left direction. Also, s is a complex frequency, $m_c$ is a mass of the elevator car, $k_c^x$ is a weighted stiffness of a car-hold dumper, and $b_c^x$ is a weighted damping of car-hold dumper. Given the estimated car acceleration, the value of the lumped force from the roller gum $f_g^x$ can be computed according to Equation (10), which implies the value of the torque $T_g^x$. The virtual relative position and velocity can be approximated by the same second filter. Accordingly, the vibration of the elevator car is minimized based only on the measurement of the acceleration.

Figure 7C:
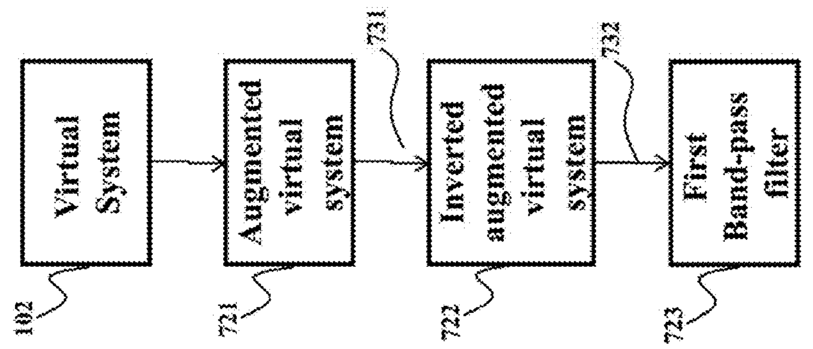
Figure 7B:
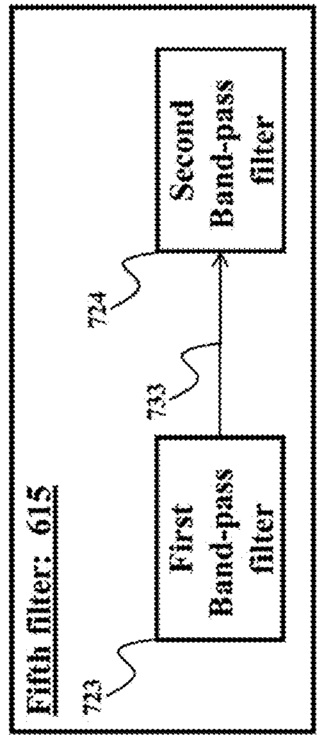

FIGS. 7B and 7C show the schematic of the fifth filter 615, and the procedure to design a first band-pass filter 723 of the fifth filter 615. FIG. 7B shows that the first band-pass filter 723 processes the input signal, typically acceleration signals, and output a signal 733 representing the second order time derivative of the virtual disturbance, then a second band-pass filter 724 processes the signal 733 to produce the estimated virtual disturbance as the output of the fifth filter.

FIG. 7C illustrates procedure method for designing the first band-pass filter. The methods start with the model of the virtual system 102, which include the virtual disturbance and its time derivative as unknown functions. The model of the virtual system originally includes state variables describing the movement of the elevator frame, car, and the virtual roller guide assembly, and is augmented by including the virtual disturbance and its time derivative as two extra state variables to produce an augmented virtual system 721, which is given by $$m_c\ddot{x}_c+f_c^x=0, \tag{16}$$

$$(m_f+m_r)\ddot{x}_f-f_c^x+f_g^x=0, \tag{17}$$

$$I_r^y\ddot{\theta}_r^y+T_g^x+T_y^x+T_u^x=0, \tag{18}$$

$$\dot{\xi}_7=\xi_8,$$

$$\dot{\tau}_8=v \tag{19}$$

$$y=\ddot{x}_f. \tag{20}$$

where $\xi_7$, $\xi_8$ represent the virtual disturbance and its time derivative respectively, and v represents the second order time derivative of the virtual disturbance. The augmented virtual system has only one unknown external input function v: the second order time derivative of the virtual disturbance.

In one embodiment, the virtual semi-active actuator is switched off, and the augmented virtual system is linear time invariant. A transfer function of the augmented virtual system, denoted by $$G_{vy}=\frac{Y(s)}{V(s)}$$

can be computed by applying Laplace transformation to the input v and output y of the augmented virtual system, has zero-poles cancellation, after which all zeros and poles are located at the left half complex plane. The augmented virtual system is invertible, thus is inverted to produce an inverted augmented virtual system 722 whose transfer function is given by $$G_{inv}=\frac{1}{G_{vy}}.$$

Based on the inverted augmented virtual system, the first band-pass filter can be determined as a copy of the inverted augmented virtual system whose input is the measured acceleration signal, and the output is the estimated second order time derivative of the virtual disturbance 733.

A copy of the inverted augmented virtual system means that the first band-pass filter has the exactly the same transfer function as the inverted augmented virtual system. The estimated second order time derivative of the virtual disturbance 733 exponentially converges to the second order time derivative of the virtual disturbance.

The second band-pass filter is designed to approximate a double integrator such that the estimated virtual disturbance can be reliably reconstructed from the estimated second order time derivative of the virtual disturbance 733. The design of the second band-pass filter to approximate a double integrator is straightforward for those skilled in the art. The method to design the first band-pass filter relies on Laplace transformation of the augmented virtual system which has to be linear time invariant. The transfer function of the augmented virtual system may not exist if the virtual semi-active actuator is switched ON and OFF over time, which means the augmented virtual system is time varying. The method teaches above still works for this case without the use of transfer function if one has a good model of the virtual semi-active actuator, thus the compensative force generated by the virtual semi-active is a known signal and its effect on the output can be removed to produce a new output which only depends on the virtual disturbance.

For example, by treating the compensative force F(t) of the virtual semi-active actuator as a known input, the augmented virtual system is linear time invariant and the Laplace transformation of its output is given by $$Y(s)=G_{vy}(s)V(s)+G_{yu}(s)F(s),$$

where F(s) is the Laplace transformation of the compensative force of the virtual semi-active actuator, and $G_{yu}$ is the transfer function from the compensative force to the output. One can redefine a new output $\bar{y}$ whose transfer function is given by $\bar{Y}(s)=Y(s)-G_{yu}F(s)$ and its time domain profile can be accordingly reconstructed. Letting the new output $\bar{y}$ as the input of the fifth filter gives the estimated second order time derivative of the virtual disturbance.

Some embodiments are based on a realization that it is beneficial to first run the elevator with semi-active actuators in the OFF position such that the virtual system is subject to forces due to the virtual disturbance only, and the Laplace transformation of the augmented virtual system is always possible. This embodiment minimizes difficulty of dealing with various uncertainties simultaneously. Letting the semi-active actuators in ON position however does not prevent the application of the method with having high fidelity knowledge about the semi-active actuators.

Figure 8:
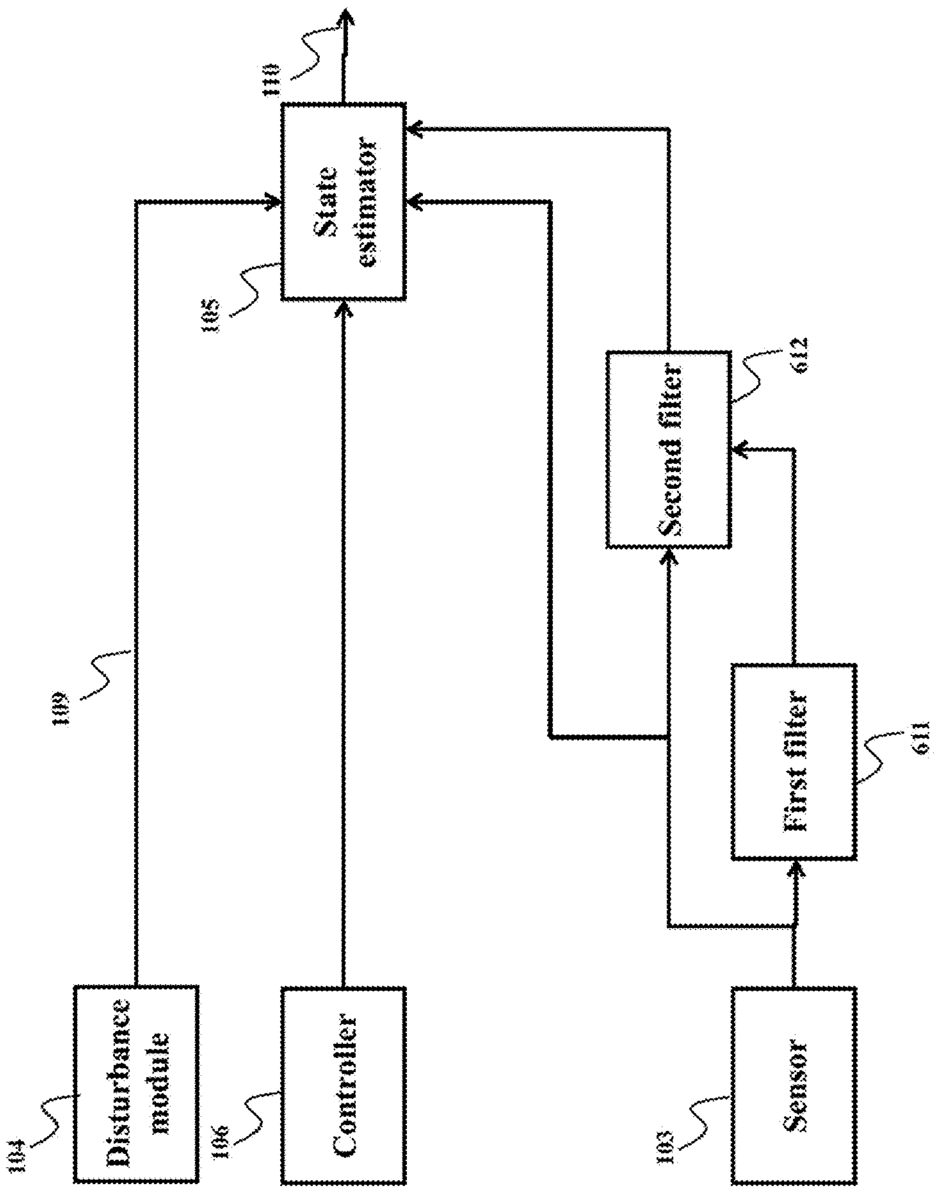
FIG. 8 is a block diagram of a state estimator of the elevator system.

FIG. 8 shows a schematic of the state estimator 105, which aims to provide the full state estimation of the virtual system. The state estimation of the virtual system measuring the translational accelerations of the frame can be difficult to solve due to limitations of the measurement scheme, which renders the virtual system unobservable. Some embodiments are based on a realization that the state estimation can be possible by performing a sequence of experiments, and decomposing the state estimation problem into two sub-problems: a problem on estimating the virtual disturbance, and a problem on estimating the state. As shown in FIG. 8, the estimation of the state of the virtual system requires the estimated virtual disturbance from disturbance module 104, control action generated by the controller 106, acceleration signals sensed by sensors 103, and the estimated virtual relative velocity from the second filter 612. In other word, the full state virtual system can be inferred from these signals. State estimator can be designed using various techniques including, but not limited to Kalman filter and Luenberger observer.

Given the estimated virtual disturbance and the estimated full state of the virtual system, various control policies are designed and implemented by various embodiments. Advantageously, the advance knowledge of the virtual disturbance coupled with the state estimation allows to implement various advanced control policies, which otherwise are difficult to implement.

Figure 9A:
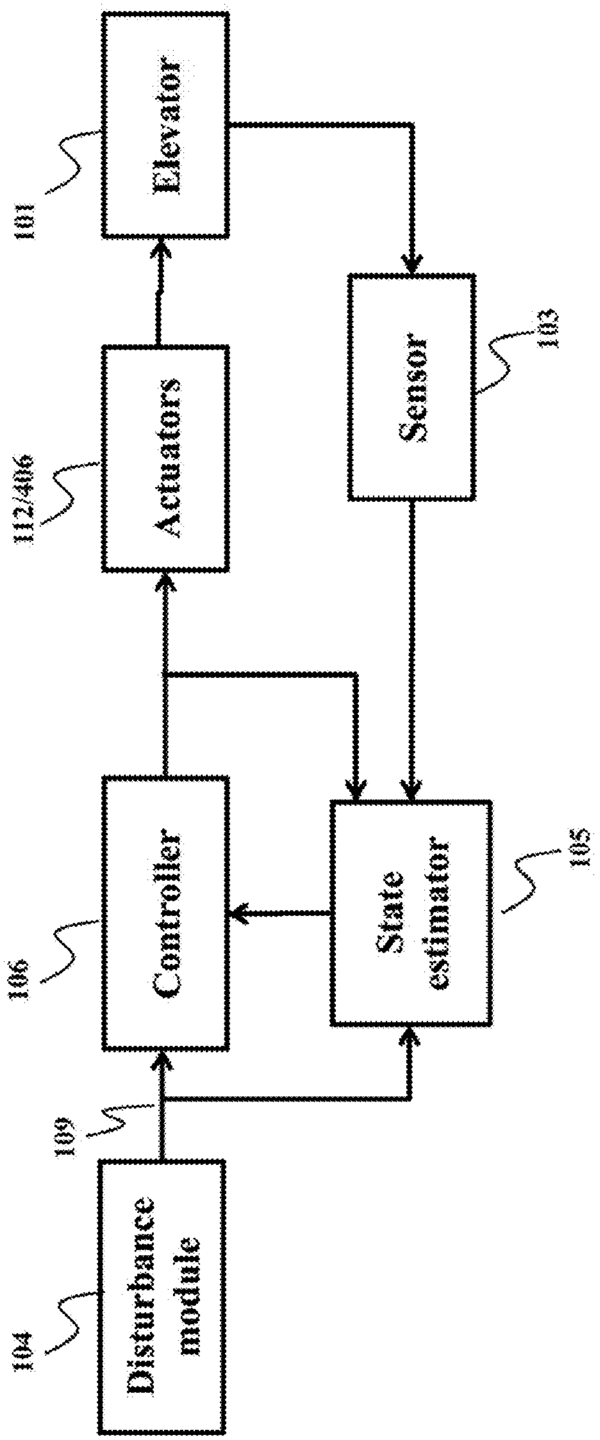
FIGS. 9A, 9B, 9C, 9D and 9E are block diagrams of methods for controlling a virtual actuator according to some embodiments of the invention.

FIG. 9A shows a block diagram of a general architecture of the close-loop control system according to one embodiment. The controller 106 controls the set of actuators 112 based on the virtual disturbance, the state of the virtual system, and the signals from sensor 103. Various modules of this architecture can be implemented using a processor connected, e.g., to memory and/or input/output interfaces.

In one embodiment, given the model of the virtual system 102, a control policy of the virtual semi-active actuator is defined 902 based on principles of the optimal control theory 940. For example, the control policy 902 optimizes a cost function 920 representing an operation of the virtual system, such that a function of a parameter of operation 930, e.g., a two norm of the mass acceleration, is optimized, e.g., minimized. The cost function is subject to various constraints 925, such as constraints on the semi-active actuators, for instance maximal and minimal damping coefficients.

The structure 904 of the control policy 902 of the virtual semi-active actuator in the virtual system can be determined, e.g., by applying the minimum principle of the optimal control theory. For example, when the virtual semi-active actuator is a damper with an adjustable viscous damping coefficient, the optimal control policy for determining a control signal $\bar{u}$ for controlling the actuators has the following structure $$\bar{u} = \begin{cases} b_{max}, & \varphi(\hat{x}, y, t)\upsilon > 0, \\ b_{min}, & \text{otherwise}, \end{cases}$$

where $\phi(\hat{x},y,t)$ is a state function 903, $\hat{x}$ is the estimated state of the virtual system, y is the signals from sensors, $\upsilon$ is the virtual relative velocity of the virtual semi-active actuator or the function of displacement 905, $b_{max}$ is the maximal damping coefficient of the virtual semi-active actuator, and $b_{min}$ is the minimal damping coefficient of the virtual semi-active actuator.

In another embodiment, wherein the semi-active actuators are dampers which generate damping forces directly, the optimal control policy has the following structure $$\bar{u} = \begin{cases} f_{max}, & \varphi(\hat{x}, y, t)\upsilon > 0, \\ f_{min}, & \text{otherwise}, \end{cases}$$

wherein $f_{max}$ is the maximal damping force of the virtual semi-active actuator, and fmin is the minimal damping force of the virtual semi-active actuator.

Figure 9B:
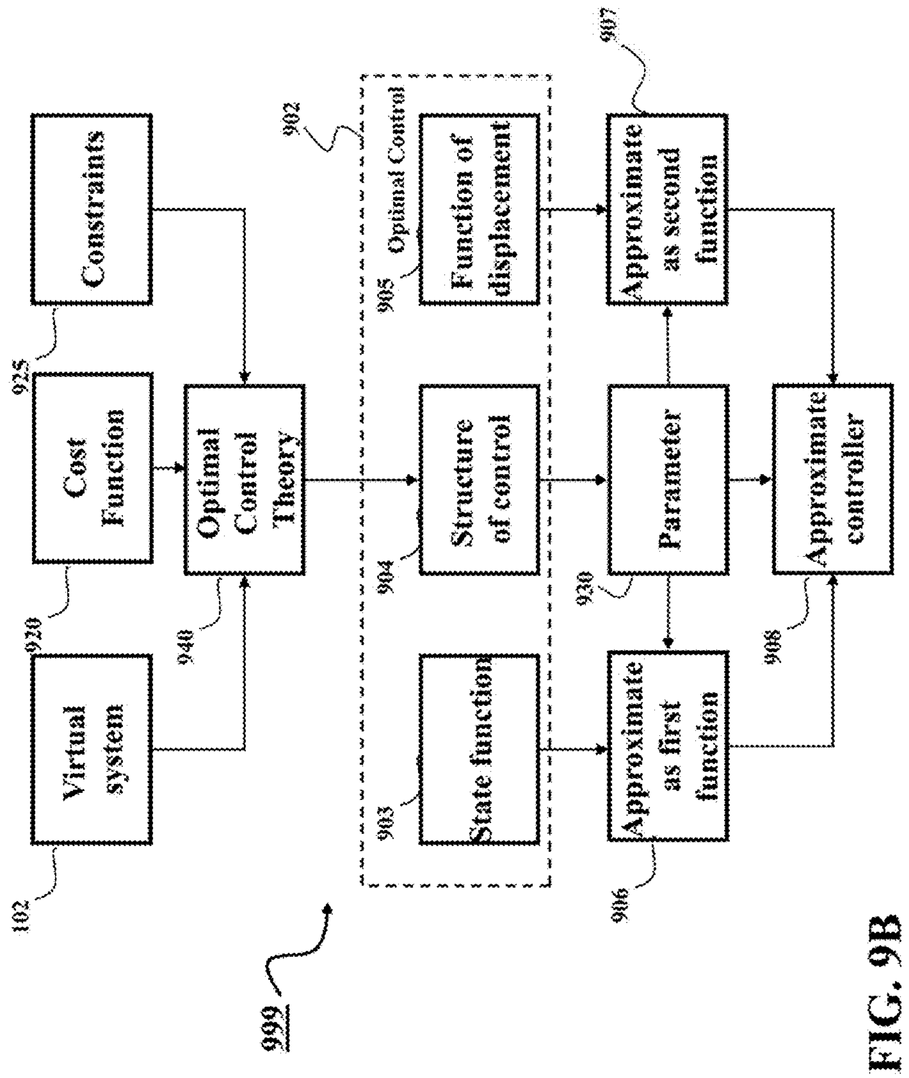
Figure 9C:
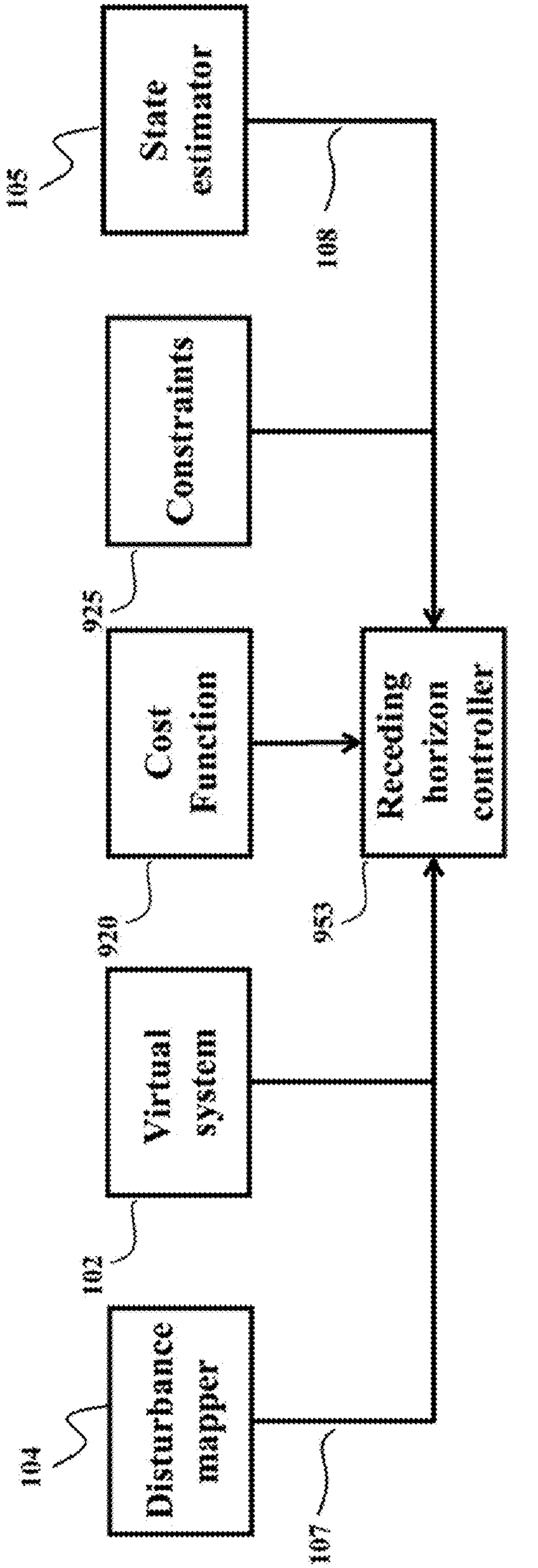

FIG. 9C discloses another embodiment controlling a set of semi-active actuators according to one embodiment of the invention. Different from the control method in FIG. 9B, where the control policy in closed-form is derived off-line, FIG. 9C presents a control method where the controller 953 computes the control policy by solving an optimization real-time on the basis of knowledge of the estimated virtual disturbance, the model of the virtual system, the cost function representing the optimal operation of the virtual system, constraints on physical system, for instance max and min currents or voltages of semi-active actuators, the estimated full state of the virtual system. The controller 953 determines the action of semi-active actuators by solving an optimization problem.

Figure 9D:
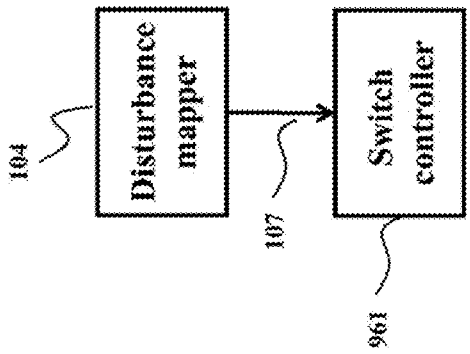

FIG. 9D discloses another embodiment controlling a set of semi-active actuators according to one embodiment of the invention. A switch controller 961 determines the action of semi-active actuators based on disturbance mapper's output. For a semi-active actuator with adjustable damping coefficient, a control policy implemented in the switch controller 961 can take the form of the following $$\bar{u} = \begin{cases} b_{max}, & \hat{w}(t) - \alpha\dot{\hat{w}}(t) > 0, \\ b_{min}, & \text{otherwise}, \end{cases}$$

where $\alpha$ is constant corresponding to the dominant resonant frequency of the elevator, $\hat{\dot{w}}(t)$ is the estimated time derivative of the virtual disturbance. Similarly for a semi-active actuator generating forces directly, a control policy implemented in the switch controller 961 can take the form of the following $$\bar{u} = \begin{cases} f_{max}, & \hat{w}(t) - \alpha\dot{\hat{w}}(t) > 0, \\ f_{min}, & \text{otherwise}. \end{cases}$$

Figure 9E:
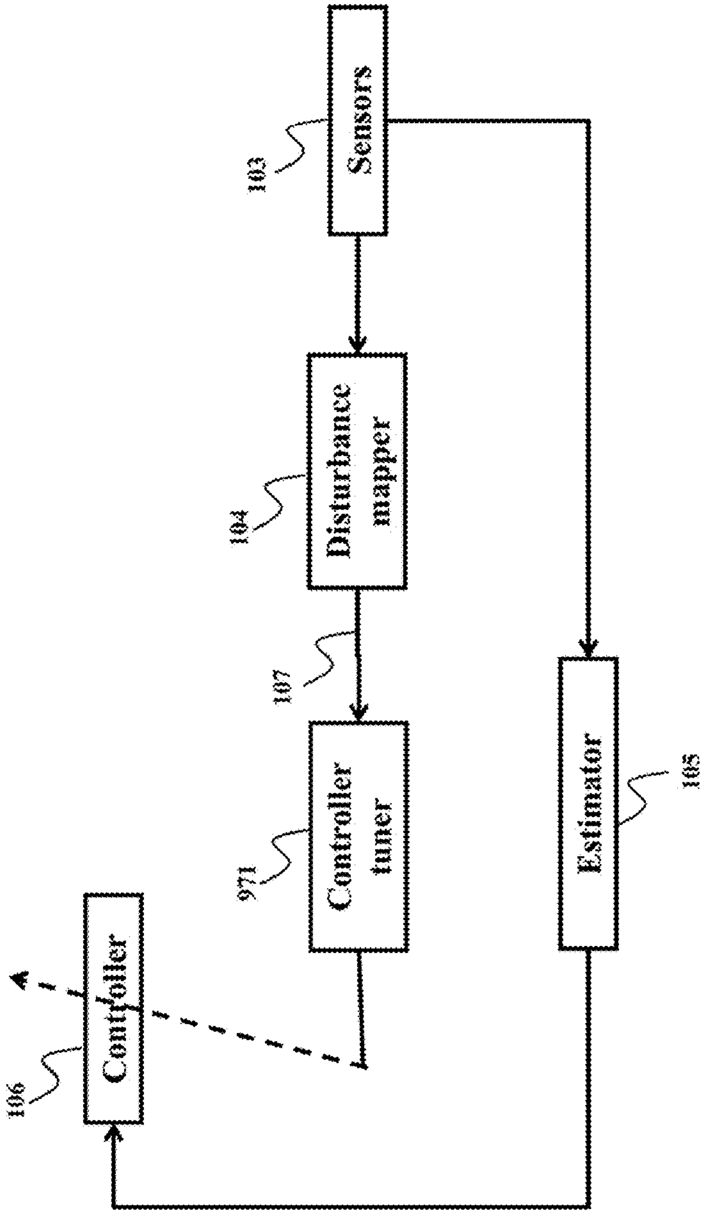

FIG. 9E discloses control architecture to control a set of semi-active actuators according to alternative embodiment of the invention. Different from embodiments described in connection with FIGS. 9A, 9B, 9D, where the implemented control policy is designed offline, and has fixed parameters during the elevator's operation, FIG. 9E shows an embodiment where the parameters of the implemented control policy are adjusted by a controller tuner 971. Because each operation has a distinctive vertical position trajectory, the virtual disturbance which the virtual system subject to is different and has different characteristics such as power spectrum, bandwidth. Given the estimated virtual disturbance over the entire period of each operation, the controller tuner processes the estimated virtual disturbance to reselect a set of parameters of the implemented control policy in the controller 106. As an example, the controller tuner can predict the power spectrum of the estimated virtual disturbance based on its profile over the entire time period of each operation, and incorporate the power spectrum of the estimated virtual disturbance into the virtual system to determine the parameters of the controller 106, or select a set of pre-determined parameters from a look-up table on the basis of the power spectrum.

Exemplary Embodiment

Figure 10:
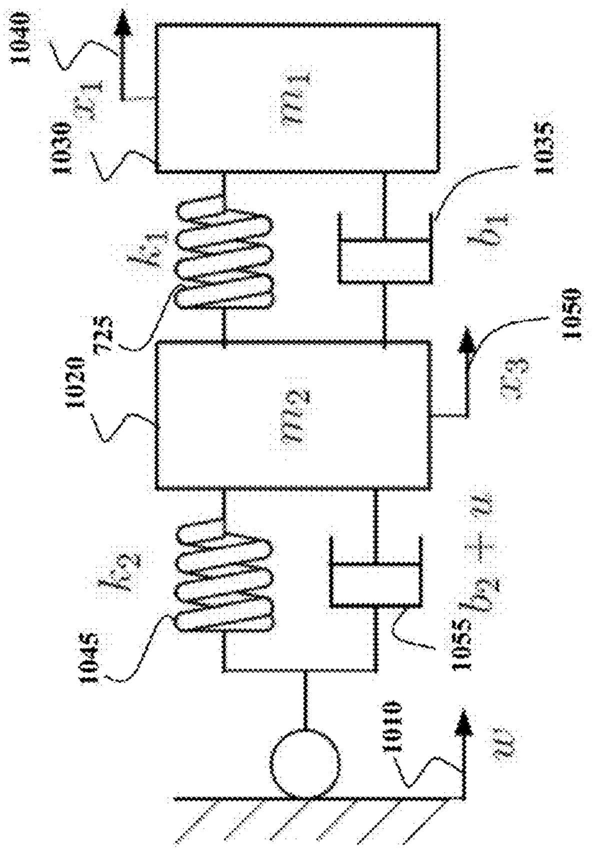
FIG. 10 is a schematic of an exemplar model of a semi-active vibration reduction system subject to an external disturbance.

FIG. 10 shows a schematic of a system represented as a mass-spring-damping system 1000 subject to a disturbance applied on the center of mass. Without loss of generality, the translational movements of the mass are horizontal. The disclosed methods are also applicable to vertical movements, for instance automotive suspensions.

In the system 1000, w is a vibration source or the external disturbance 1010, $m_1$ and $m_2$ represent masses of an elevator car 1030 and an elevator frame 1020, respectively, $k_1$ 1025 and $b_1$ 1035 are the lumped stiffness and damping of support rubbers between the car and the frame, $k_2$ 1045 and $b_2$ 1055 are the stiffness and damping of springs between the frame and the guide rail, $x_1$ and $x_3$ are the horizontal displacements 1040 and 1050 of the car and the frame respectively, and $x_2=\dot{x}_1$ and $x_4=\dot{x}_3$ are the horizontal velocities of the car and the frame, respectively.

The model as expressed in Equation (1) of the disturbed mass-spring-damping system can be written as $$\begin{bmatrix} \dot{x}_1 \\ \dot{x}_2 \\ \dot{x}_3 \\ \dot{x}_4 \end{bmatrix} = \begin{bmatrix} 0 & 1 & 0 & 0 \\ -\frac{k_1}{m_1} & -\frac{b_1}{m_1} & \frac{k_1}{m_1} & \frac{b_1}{m_1} \\ 0 & 0 & 0 & 1 \\ \frac{k_1}{m_2} & \frac{b_1}{m_2} & -\frac{k_1+k_2}{m_2} & -\frac{b_1}{m_2} \end{bmatrix} \begin{bmatrix} x_1 \\ x_2 \\ x_3 \\ x_4 \end{bmatrix} + \begin{bmatrix} 0 \\ 0 \\ 0 \\ -\frac{x_4 - \dot{w}}{m_2} \end{bmatrix} (u + b_{2d}) + \begin{bmatrix} 0 \\ 0 \\ 0 \\ \frac{k_2}{m_2} \end{bmatrix} w,$$

$$y = \dot{x}_4,$$

where u is the controlled damping coefficient of the semi-active actuator, and y represents the measured parameter of operation, i.e., the acceleration of the frame. The control signal u is designed to minimize the car acceleration $\ddot{x}_1$. Because there is only one disturbance, the physical semi-active actuator is the virtual semi-active actuator, and the virtual disturbance is the physical disturbance. Thus the system model based on equation (1) also represents the virtual system model. For the automotive suspension case, the car suspension is modeled similarly but the movement of masses is in the vertical direction, and the guide rail is replaced with the road.

This embodiment uses the sensors 103 to measure only frame acceleration, i.e. the parameter of operation is the frame acceleration, i.e., $y=\dot{x}_4$, thus the true values of the state x and the relative velocity $\eta=x_4-\dot{w}$ are not measured. Due to an inherent observability issue with the acceleration measurement, this embodiment considers an approximate optimal control according to $$u=\begin{cases} b_{max}, & \hat{\varphi}(y,t)\hat{\dot{\eta}}>0,\\ b_{min}, & \text{otherwise,}\end{cases}$$

where $\hat{\dot{\eta}}$ is the approximation of the function of displacement $\hat{\dot{\eta}}$. One variation of the embodiment uses the following approximate optimal control $$u=\begin{cases} b_{max}, & (c_1\hat{\ddot{x}}_1+c_2y+\hat{x}_4)\hat{\dot{\eta}}>0,\\ b_{min}, & \text{otherwise,}\end{cases}$$

where $c_1$ and $c_2$ are constant, $\hat{\ddot{x}}_1$ is the estimated car acceleration, and $\hat{x}_4$ is the estimated velocity of the frame.

Figure 11:
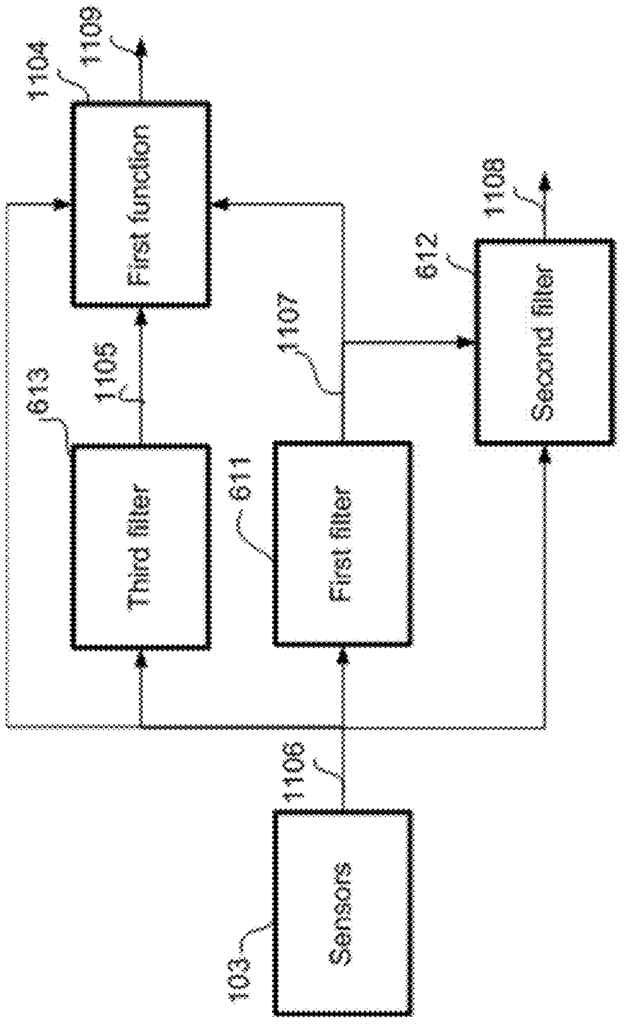
FIG. 11 is a block diagram of a system of filters for approximation of control policy according to some embodiments of the invention.

Corresponding to FIG. 11, the approximation of the car acceleration is the output of the first filter 611, the approximation of the virtual relative velocity is the output of the second filter 612, and the approximation of the frame velocity is the output the third filter 613. The first function of the approximate control policy is evaluated in block 1104.

Given the virtual system model expressed in Equation (1), treating the measured signal y as a known variable, and denoting the virtual relative position η, the dynamics of the virtual relative position can be derived as follows $$\dot{\eta}=-\frac{1}{b_2+u}[k_2\eta+m_1\dot{x}_2+m_2y] \tag{21}$$

where the car acceleration $\dot{x}_2$ can be estimated by the first filter $$\dot{\xi}_1=\xi_2, \tag{22}$$

$$\dot{\xi}_2=-\frac{k_1}{m_1}\xi_1-\frac{b_1}{m_1}\xi_2+y,$$

$$\hat{\dot{x}}_2=\frac{k_1}{m_1}\xi_1+\frac{b_1}{m_1}\xi_2.$$

The first filter (22) processes the frame acceleration as its input, and outputs the estimation of the car acceleration. The output of the first filter (22), denoted by $\hat{\dot{x}}_2$, converges to the true value of the car acceleration $\dot{x}_2$. With the estimated car acceleration, the dynamics of the virtual relative position (21) is described by a linear time varying first order differential equation whose right hand side is a function of the virtual relative position, and known variables including the measured signal, and the estimated car acceleration.

The second filter estimates the virtual relative velocity of the virtual actuator according to $$\dot{\hat{\eta}}=-\frac{1}{b_2+u}\left[k_2\hat{\eta}+m_1\hat{\dot{x}}_2+m_2y\right],$$

$$z=-\frac{1}{b_2+u}\left[k_2\hat{\eta}+m_1\hat{\dot{x}}_2+m_2y\right],$$

where $\hat{\eta}$ is the estimation of the virtual relative position, and z denotes the estimation of the virtual relative velocity, or the approximation of the value of the function of displacement. The second filter provide asymptotic approximation of the function of displacement, i.e., the output of the second filter converges to the true value of the function of displacement as time goes infinity, and the convergent speed is exponential.

The filters disclosed herein provide a globally exponentially convergent estimation of the relative velocity and the car acceleration. This approach can be readily employed to estimate the relative velocity between the car and the frame, thus when the semi-active actuator is placed between the car and the frame, the disclosed control method is also applicable.

The fifth filter 615 for the system 1000 can be determined by following the procedure taught above. The model of the system 1000 is augmented to include the virtual disturbance and its first order time derivative as two extra state variables. The augmented virtual system is written as follow $$\begin{bmatrix}\dot{x}_1\\ \dot{x}_2\\ \dot{x}_3\\ \dot{x}_4\\ \dot{x}_5\\ \dot{x}_6\end{bmatrix}=$$

$$\begin{bmatrix} 0 & 1 & 0 & 0 & 0 & 0\\ -\frac{k_1}{m_1} & -\frac{b_1}{m_1} & \frac{k_1}{m_1} & \frac{b_1}{m_1} & 0 & 0\\ 0 & 0 & 0 & 1 & 0 & 0\\ \frac{k_1}{m_2} & \frac{b_1}{m_2} & -\frac{k_1+k_2}{m_2} & -\frac{b_1+u+b_{2d}}{m_2} & \frac{k_2}{m_2} & \frac{b_{2d}+u}{m_2}\\ 0 & 0 & 0 & 0 & 0 & 1\\ 0 & 0 & 0 & 0 & 0 & 0\end{bmatrix}\begin{bmatrix}x_1\\ x_2\\ x_3\\ x_4\\ x_5\\ x_6\end{bmatrix}+\begin{bmatrix}0\\0\\0\\0\\0\\1\end{bmatrix}v$$

$$y=\dot{x}_4$$

where $v=\ddot{w}$ is the second order time derivative of the virtual disturbance, $x_5=w$ and $x_6=\dot{w}$ is the first order time derivative of the virtual disturbance. Treating the second order time derivative as external unknown input and letting u=0 for simplicity, a transfer function from the external unknown input to the measured signal y can be computed and denoted as $$G_v(s)=\frac{Y(s)}{V(s)}.$$

where Y(s), V(s) are the Laplace transformation of signal y(t), v(t) respectively. The transfer function has two zero-pole cancellations, but it does not affect the reconstruction of the external unknown input. A transfer function of the inverted augmented virtual system can be readily obtained by inverting the transfer function $G_v(s)$. Thus the band-pass filter 1 has a transfer function as follows $$G_{bpf1}(s) = \frac{1}{G_v(s)}.$$

The external unknown input can be reconstructed as $$\hat{v}(t)=G_{bpf1}(s)*Y(s)$$

where * denotes the convolution.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling a set of semi-active actuators arranged in an elevator system to minimize a vibration of an elevator car caused by a set of disturbances on the elevator car in a horizontal direction, comprising:

representing the elevator system with a model of a virtual elevator system having a single virtual semi-active actuator arranged to compensate a virtual disturbance proportional to a sum of disturbances from the set of disturbances, wherein a compensative force of the virtual semi-active actuator is proportional to a sum of compensative forces of the set of semi-active actuators;

augmenting the model with the virtual disturbance and a time derivative of the virtual disturbance as state variables to produce an augmented model;

inverting the augmented model to define a relationship between a second order time derivative of the virtual disturbance and an acceleration signal;

determining, using the relationship, the second order time derivative of the virtual disturbance for each acceleration value of the acceleration signal;

integrating twice the second, order time derivative to produce a value of the virtual disturbance forming a time profile of the virtual disturbance;

producing a disturbance profile of the virtual disturbance based on a time profile of the virtual disturbance and a vertical position trajectory;

determining the virtual disturbance during an operation of the elevator car using a motion profile of a position of the elevator car during an operation and a disturbance profile of the virtual disturbance;

determining a state of the elevator system using the model of the virtual elevator system, the virtual disturbance and a signal indicative of a horizontal acceleration of the elevator car during the operation;

controlling each actuator of the set of semi-active actuators based on the state of the elevator system and according to a control policy of the virtual semi-active actuator, wherein steps of the method are performed by a processor.

2. The method of claim 1, wherein the signal is an acceleration signal, further comprising:

receiving acceleration values of the acceleration signal measured at different vertical positions of the elevator car during an operation of the elevator system without a usage of the set of actuators, wherein the operation is according to a vertical position trajectory; and determining, based on the model and the acceleration values, the disturbance profile of the virtual disturbance.

3. The method of claim 1, wherein the inverting is based on an inverse of a transfer a function.

4. The method of claim 1, further comprising:

defining an estimator with a transfer function as an inverse of the transfer function from the second order time derivative of the virtual disturbance to the acceleration signal;

operating the elevator system without using the set of actuators to produce the acceleration signal; and determining the second order time derivative of the virtual disturbance as an output of the estimator processing the acceleration signal.

5. The method of claim 2, further comprising determining a relative position between two ends of the virtual semi-active actuator based, on the acceleration signal;

determining a horizontal displacement of the elevator car based on the acceleration, signal; and summing the relative position and the horizontal displacement to produce a time profile of the virtual disturbance; and producing the disturbance profile using the time profile of the virtual disturbance and a vertical position trajectory.

6. The method of claim 5, further comprising:

determining the relative position based on dynamics of the virtual elevator system.

7. The method of claim 1, wherein the determining the state further comprising:

designing a state estimator using the virtual system model as a function of the virtual disturbance, a first order time derivative of the virtual disturbance, the signal, and an estimated relative velocity; and determining a state of the elevator system using the state estimator.

8. The method of claim 1, wherein the state estimator includes a Kalman filter or Luenberger observer.

9. The method of claim 1, wherein the controlling adjusts an input of actuators based on a receding horizon control algorithm.

10. The method of claim 1, wherein the controlling generates a command to switch ON and OFF actuators based on the virtual disturbance and a time derivative of the virtual disturbance.

11. The method of claim 1, wherein the controlling tunes parameters of controllers designed offline based on a power spectrum and a he estimated virtual disturbance.

12. The method of claim 1, further comprising:

adjusting the virtual disturbance indicated by the disturbance profile determined before the operation of the elevator car based on the signal representing the acceleration during the operation.

13. A system for controlling a set of semi-active actuators arranged in an elevator system to compensate for a set of disturbances, comprising:

a sensor for determining an acceleration signal indicative of a horizontal acceleration of the elevator car during an operation of the elevator system;

a processor for determining based on a model of a virtual elevator system and an acceleration signal, a disturbance profile of a virtual disturbance representing the set of disturbances, wherein the model of the virtual elevator system includes a single virtual semi-active actuator having a compensative force proportional to a sum of compensative forces of the set of semi-active actuators and arranged to compensate for the virtual disturbance proportional to a sum of disturbances from the set of disturbances, and wherein the acceleration signal is measured at different vertical positions of the elevator car during the operation of the elevator system without usage of the set of actuators, wherein the processor is configured for:

augmenting the model with the virtual disturbance and a time derivative of the virtual disturbance as state variables to produce an augmented model;

inverting the augmented model to determine a relationship between a second order time derivative of the virtual disturbance and the acceleration signal;

determining, using the relationship, the second order time derivative of the virtual disturbance for each acceleration value of the acceleration signal;

integrating twice the second order time derivative to produce a value of the virtual disturbance forming a time profile of the virtual disturbance;

producing the disturbance profile of the virtual disturbance based on the time profile of the virtual disturbance and a vertical position trajectory; and a controller for controlling each actuator of the set of semi-active actuators according to a control policy of the virtual semi-active actuator using the disturbance profile of the virtual disturbance and the acceleration signal measured during the operation of the elevator car with usage of the set of actuators.

* * * * *